United States Patent
Takemura

(10) Patent No.: US 11,824,942 B2
(45) Date of Patent: Nov. 21, 2023

(54) COMMUNICATION SYSTEM, INFORMATION PROCESSING APPARATUS, AND INFORMATION PROCESSING METHOD

(71) Applicant: Kazumasa Takemura, Kanagawa (JP)

(72) Inventor: Kazumasa Takemura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/711,273

(22) Filed: Apr. 1, 2022

(65) Prior Publication Data

US 2022/0337664 A1 Oct. 20, 2022

(30) Foreign Application Priority Data

Apr. 15, 2021 (JP) .................................. 2021-069184

(51) Int. Cl.
*H04L 67/141* (2022.01)
*H04L 67/143* (2022.01)

(52) U.S. Cl.
CPC .......... *H04L 67/141* (2013.01); *H04L 67/143* (2013.01)

(58) Field of Classification Search
None
See application file for complete search history.

(56) References Cited

U.S. PATENT DOCUMENTS

| | | | |
|---|---|---|---|
| 11,442,755 B1* | 9/2022 | Patimer | H04L 63/08 |
| 2007/0014244 A1* | 1/2007 | Srinivasan | G06Q 10/107 370/242 |
| 2008/0282081 A1* | 11/2008 | Patiejunas | H04L 63/164 713/153 |
| 2014/0040397 A1* | 2/2014 | Bomgaars | H04L 41/50 709/217 |
| 2015/0244835 A1* | 8/2015 | Fausak | H04L 67/04 709/203 |
| 2016/0267257 A1* | 9/2016 | Wisgo | G06F 21/12 |
| 2017/0019498 A1* | 1/2017 | Ng | H04L 63/105 |
| 2018/0103092 A1 | 4/2018 | Watanabe et al. | |
| 2018/0131688 A1* | 5/2018 | Fang | H04L 63/0823 |
| 2020/0404499 A1* | 12/2020 | Zhu | H04W 76/10 |

FOREIGN PATENT DOCUMENTS

| | | | |
|---|---|---|---|
| JP | 2005-175866 | | 6/2005 |
| JP | 2017-069861 | | 4/2017 |
| JP | 2017069861 A | * | 4/2017 |
| JP | 2018-061201 | | 4/2018 |

* cited by examiner

*Primary Examiner* — Schquita D Goodwin
*Assistant Examiner* — Ishrat Rashid
(74) *Attorney, Agent, or Firm* — IPUSA, PLLC

(57) ABSTRACT

A communication system, an information processing apparatus, and an information processing method each of which: connects an information terminal connected to a first network to a connection-destination device connected to a second network different from the first network, and transmits a message to the information terminal connected to the connection-destination device, based on information related to a use state of the connection-destination device.

13 Claims, 22 Drawing Sheets

FIG. 8

| CONNECTION DESTINATION ID | NAME | IP ADDRESS/ HOST NAME | SECURE BOX | STATE | USER | SESSION ID | LAST USE DATE AND TIME |
|---|---|---|---|---|---|---|---|
| Dest01 | SATO'S PC | 192.168.1.1 | SECURE BOX A | AVAILABLE | - | - | 2020/1/1 10:00 |
| Dest02 | SUZUKI'S PC | 192.168.1.2 | SECURE BOX A | IN USE | SUZUKI | 000001 | 2020/1/2 12:34 |
| Dest03 | GROUP C SHARED | 192.168.1.3 | SECURE BOX B | IN USE | SATO | 000002 | 2020/1/4 13:30 |
| ... | ... | ... | ... | ... | ... | ... | ... |

FIG. 9

| CONNECTION DESTINATION ID | NAME | IP ADDRESS/ HOST NAME | SECURE BOX | STATE | USER | SESSION ID | LAST USE DATE AND TIME |
|---|---|---|---|---|---|---|---|
| FaxDest01 | GROUP A SHARED | 192.168.1.11 | SECURE BOX A | IN USE | TANAKA | - | 2020/1/3 13:00 |
| FaxDest02 | GROUP B SHARED | 192.168.1.12 | SECURE BOX B | AVAILABLE | - | 000003 | 2020/1/4 10:00 |
| FaxDest03 | GROUP C SHARED | 192.168.1.13 | SECURE BOX B | IN USE | SUZUKI | 000004 | 2020/1/5 15:30 |
| ... | ... | ... | ... | ... | ... | ... | ... |

FIG. 10

| USER ID | NAME | PASSWORD (HASHED VALUE) |
|---|---|---|
| u_30623016 | SUZUKI | 427E170F76F81F7742E9DA100D71346AA631ACB3F9980A1A41680883C0654431 |
| u_53293025 | SATO | 109548320E1216758D686029CDDF1B1E1AABBF6DC107737E11EEC5652E1D31E1 |
| u_32653303 | TANAKA | 6BC20F8892242A407D8F80B2F42A73D72FB45A4368369C06D9A2E636C51299F6 |
| ... | ... | ... |

| SECURE BOX ID | NAME |
|---|---|
| b_76052347 | SECURE BOX A |
| b_39696039 | SECURE BOX B |
| b_80734640 | SECURE BOX C |
| ... | ... |

| POLICY ID | POLICY NAME | PRIORITY | USER ID | SERVICE | ACTION |
|---|---|---|---|---|---|
| p_63619389 | INFORMATION SYSTEM DEPT., MANAGER | 00000001 | u_30623016<br>u_53293025<br>u_32653303 | s_89645095 | a_64499849 |
| p_10034703 | INFORMATION SYSTEM DEPT., GENERAL | 00000002 | ug_20816657 | sg_29114097 | a_64499849 |
| p_47089709 | SECURITY PROMOTION DEPT., MANAGER | 00000003 | ug_42783520 | s_89645095 | a_11030259 |
| ... | ... | | ... | ... | ... |

335

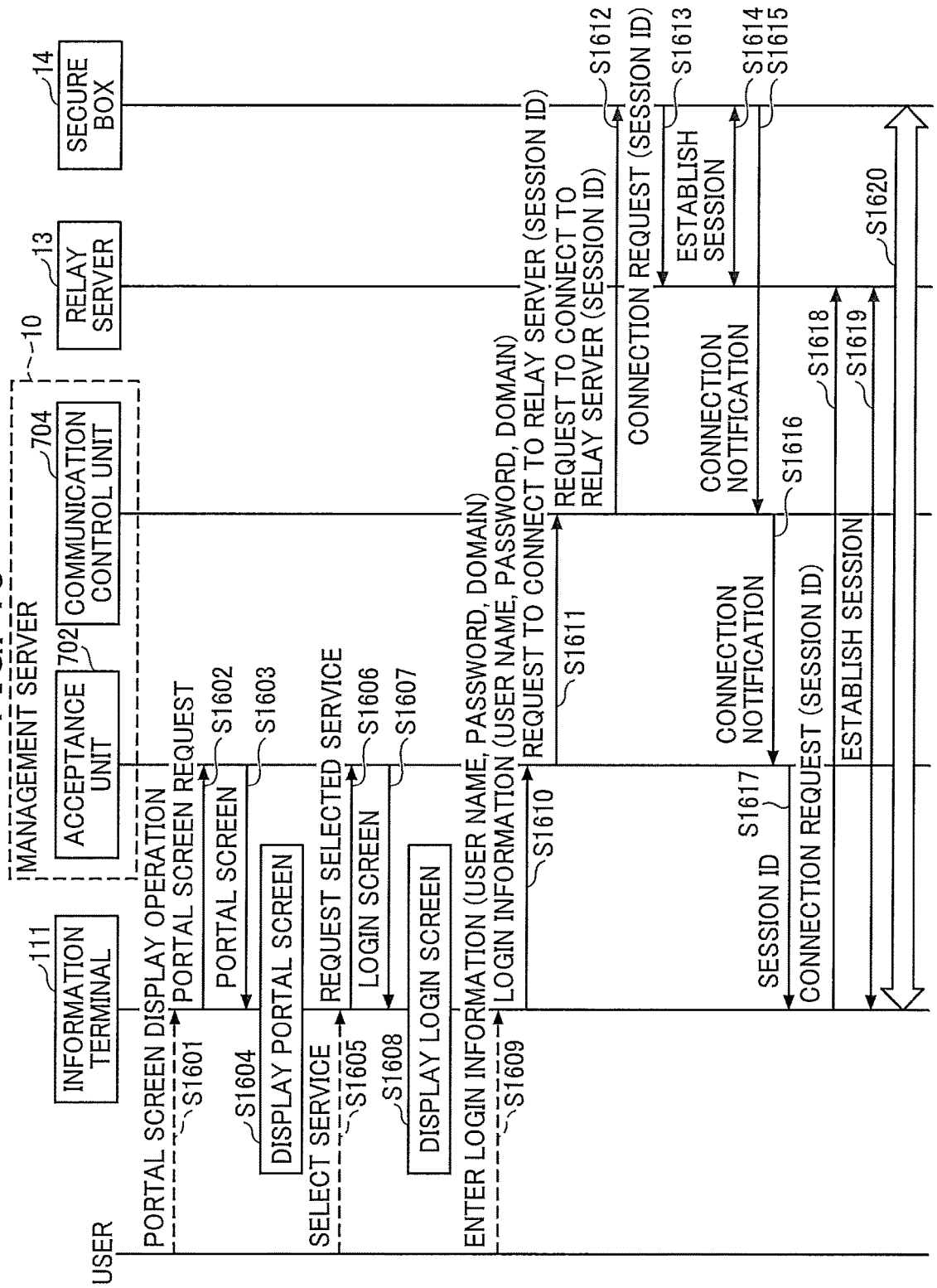

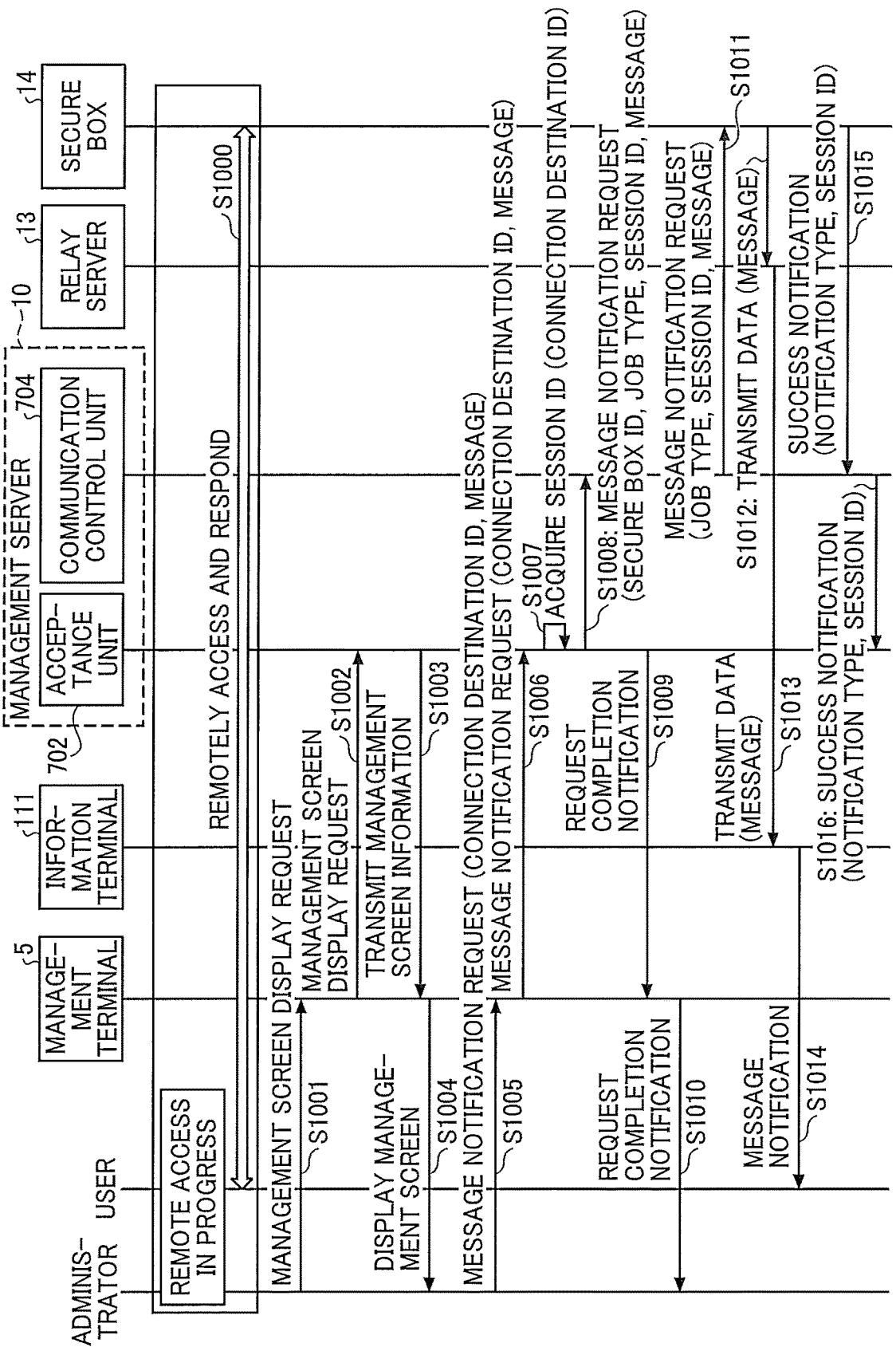

FIG. 16

| CONNECTION DESTINATION MANAGEMENT | | | | |
|---|---|---|---|---|
| SECURE REMOTE WORKPLACE SERVICE | PLEASE SELECT A COMPUTER NAME AND PRESS EACH FUNCTION BUTTON. | | | |
| REMOTE DESKTOP SERVICE | NEW REGISTRATION | SEND MESSAGES IN BATCHES | BATCH TERMINATION | |
| SETTINGS | CONNECTION DESTINATION | IP ADDRESS | SECURE BOX | USE STATE |
| REMOTE DESKTOP SERVICE/ CONNECTION DESTINATION MANAGEMENT | ☐ SATO'S PC | 192.168.1.1 | SECURE BOX A | AVAILABLE |
| USER MANAGEMENT | ☐ SUZUKI'S PC | 192.168.1.2 | SECURE BOX A | IN USE (SUZUKI) |
| USE RIGHT/ POLICY MANAGEMENT | ☑ GROUP SHARED PC | 192.168.1.3 | SECURE BOX B | SEND MESSAGE  ✎ 🗑  FORCED TERMINATION |
| BOX MANAGEMENT | ☐ GROUP SHARED PC 2 | 192.168.1.4 | SECURE BOX A | IN USE (TAKAHASHI) |
| LOG MANAGEMENT | ☐ TANAKA'S PC | 192.168.1.5 | SECURE BOX B | AVAILABLE |
| | ☐ ITO'S PC | 192.168.1.6 | SECURE BOX B | AVAILABLE |
| | ☐ WATANABE'S PC | 192.168.1.7 | SECURE BOX B | AVAILABLE |
| | ☐ YAMAMOTO'S PC | 192.168.1.8 | SECURE BOX B | IN USE (YAMAMOTO) |
| | ☐ NAKAMURA'S PC | 192.168.1.9 | SECURE BOX B | AVAILABLE |
| | ☐ KOBAYASHI'S PC | 192.168.1.10 | SECURE BOX B | AVAILABLE |
| | ☐ KATO'S PC | 192.168.1.11 | SECURE BOX B | AVAILABLE |

FIG. 17

| CONNECTION DESTINATION MANAGEMENT | | | | |
|---|---|---|---|---|
| SECURE REMOTE WORKPLACE SERVICE | PLEASE SELECT A COMPUTER NAME AND PRESS EACH FUNCTION BUTTON. | | | |
| REMOTE DESKTOP SERVICE | NEW REGISTRATION | SEND MESSAGES IN BATCHES | BATCH TERMINATION | |
| SETTINGS | CONNECTION DESTINATION | IP ADDRESS | SECURE BOX | USE STATE |
| REMOTE DESKTOP SERVICE/ CONNECTION DESTINATION MANAGEMENT | ☐ SEND MESSAGE | | | AVAILABLE |
| USER MANAGEMENT | PLEASE ENTER A MESSAGE TO BE SENT TO THE USER WHO IS USING THE CONNECTION DESTINATION "GROUP SHARED PC". | | | IN USE (SUZUKI) [✎] [🗑] [FORCED TERMINATION] |
| USE RIGHT/ POLICY MANAGEMENT | MAINTENANCE WILL START IN 5 MINUTES. | | | IN USE (TAKAHASHI) |
| BOX MANAGEMENT | | | 1037 | AVAILABLE |
| LOG MANAGEMENT | CANCEL | | OK | AVAILABLE |
| | ☐ YAMAMOTO'S PC | 192.168.1.8 | SECURE BOX B | IN USE (YAMAMOTO) |
| | ☐ NAKAMURA'S PC | 192.168.1.9 | SECURE BOX B | AVAILABLE |
| | ☐ KOBAYASHI'S PC | 192.168.1.10 | SECURE BOX B | AVAILABLE |
| | ☐ KATO'S PC | 192.168.1.11 | SECURE BOX B | AVAILABLE |

1021

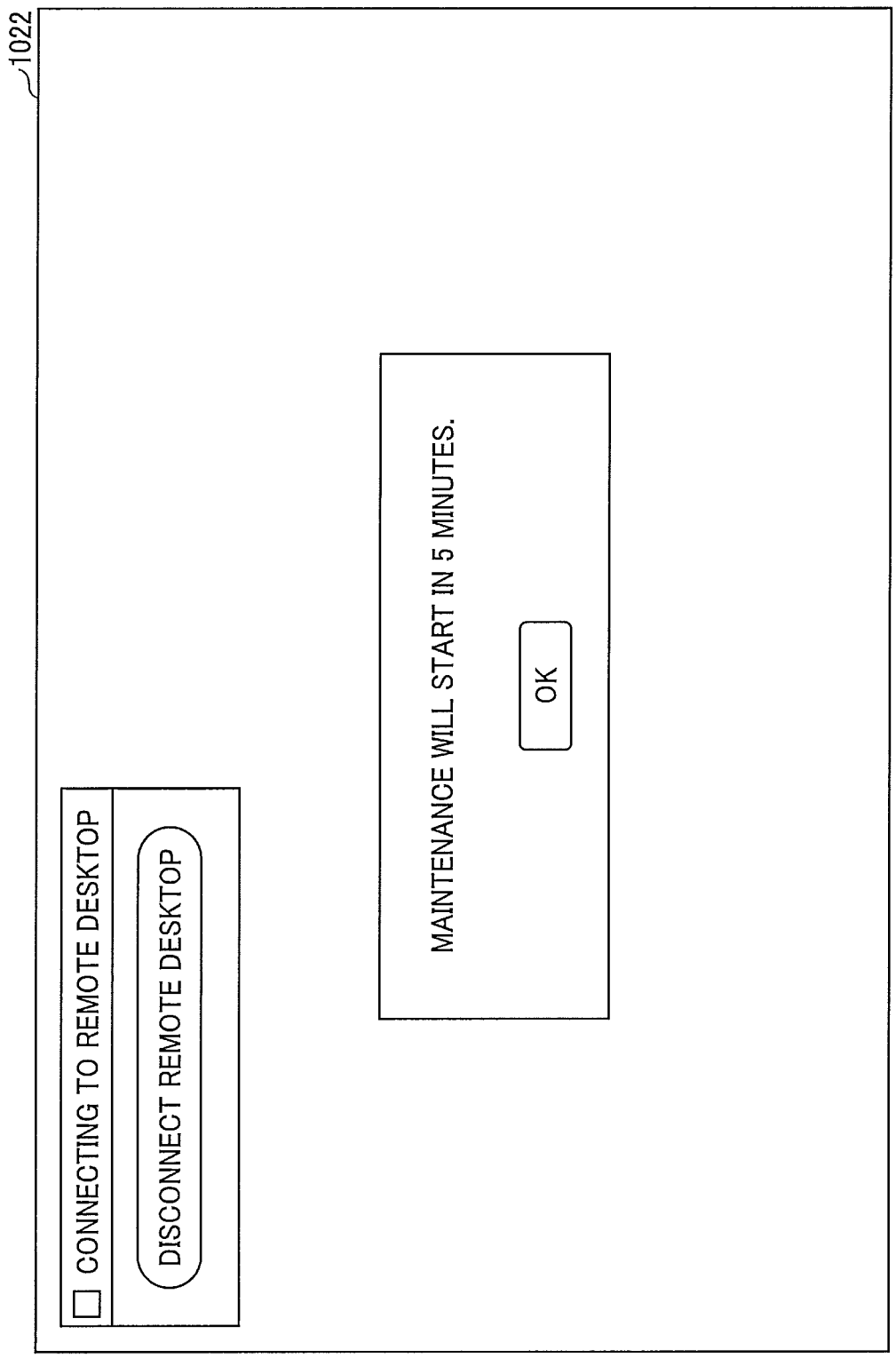

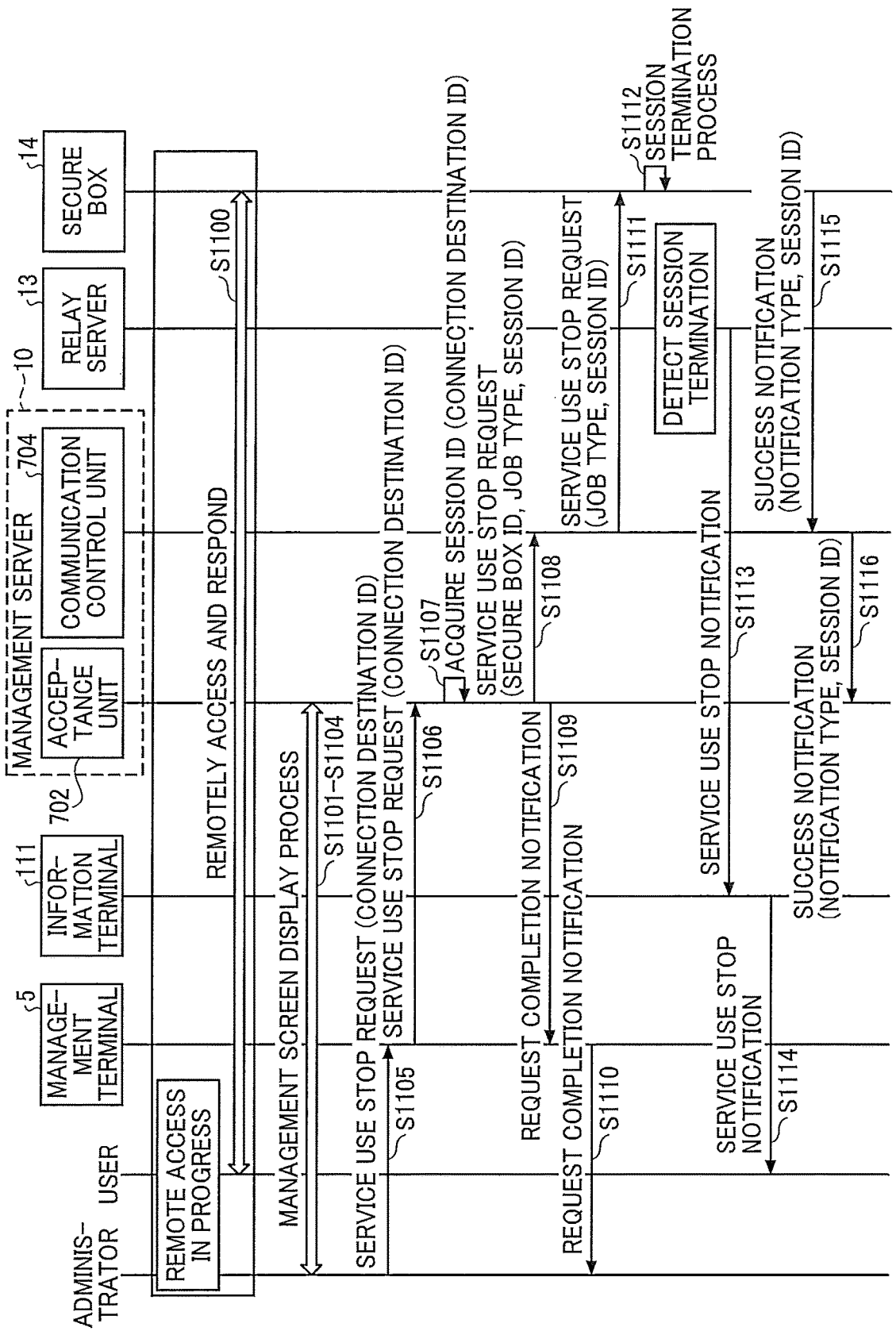

FIG. 20

| CONNECTION DESTINATION MANAGEMENT | | | | |
|---|---|---|---|---|
| SECURE REMOTE WORKPLACE SERVICE | PLEASE SELECT A COMPUTER NAME AND PRESS EACH FUNCTION BUTTON. | | | |
| REMOTE DESKTOP SERVICE | NEW REGISTRATION | SEND MESSAGES IN BATCHES | BATCH TERMINATION | |
| SETTINGS | CONNECTION DESTINATION | IP ADDRESS | SECURE BOX | USE STATE |
| REMOTE DESKTOP SERVICE/ CONNECTION DESTINATION MANAGEMENT | ☐ SERVICE USE STOP | | | AVAILABLE |
| USER MANAGEMENT | DO YOU WISH TO STOP USING THE CONNECTION DESTINATION "GROUP SHARED PC"? | | | IN USE (SUZUKI) SEND MESSAGE ✎ 🗑 FORCED TERMINATION |
| USE RIGHT/ POLICY MANAGEMENT | | | 1038 | IN USE (TAKAHASHI) |
| BOX MANAGEMENT | CANCEL | OK | | AVAILABLE |
| LOG MANAGEMENT | ☐ ITO'S PC | 192.168.1.6 | SECURE BOX B | AVAILABLE |
| | ☐ WATANABE'S PC | 192.168.1.7 | SECURE BOX B | AVAILABLE |
| | ☐ YAMAMOTO'S PC | 192.168.1.8 | SECURE BOX B | IN USE (YAMAMOTO) |
| | ☐ NAKAMURA'S PC | 192.168.1.9 | SECURE BOX B | AVAILABLE |
| | ☐ KOBAYASHI'S PC | 192.168.1.10 | SECURE BOX B | AVAILABLE |
| | ☐ KATO'S PC | 192.168.1.11 | SECURE BOX B | AVAILABLE |

| PROHIBITION RULE ID | CONNECTION DESTINATION ID | START TIME | END TIME | REPETITION | UNIT OF REPETITION | PERIOD START DATE | PERIOD END DATE | NOTIFICATION SETTING | NOTIFICATION TIME | NOTIFICATION MESSAGE |
|---|---|---|---|---|---|---|---|---|---|---|
| Period01 | Dest01 | 0:00 | 6:00 | NO | - | 2020/1/10 | 2020/1/10 | YES | 5 MINUTES BEFORE | MAINTENANCE WILL START IN 5 MINUTES. |
| Period02 | Dest01 | 0:00 | 5:00 | NO | - | 2020/1/11 | 2020/1/11 | NO | - | - |
| Period03 | Dest02 | 1:00 | 4:00 | YES | WEEKLY: SATURDAY | 2020/1/1 | 2020/12/31 | YES | 1 MINUTE BEFORE | COMMUNICATION WILL BE DISCONNECTED SOON BECAUSE OF THE PERIODIC MAINTENANCE. |
| Period04 | Dest03 | 0:30 | 3:00 | YES | EVERY DAY | 2020/1/1 | 2021/6/30 | NO | - | - |
| ... | ... | | | | ... | ... | ... | ... | ... | ... |

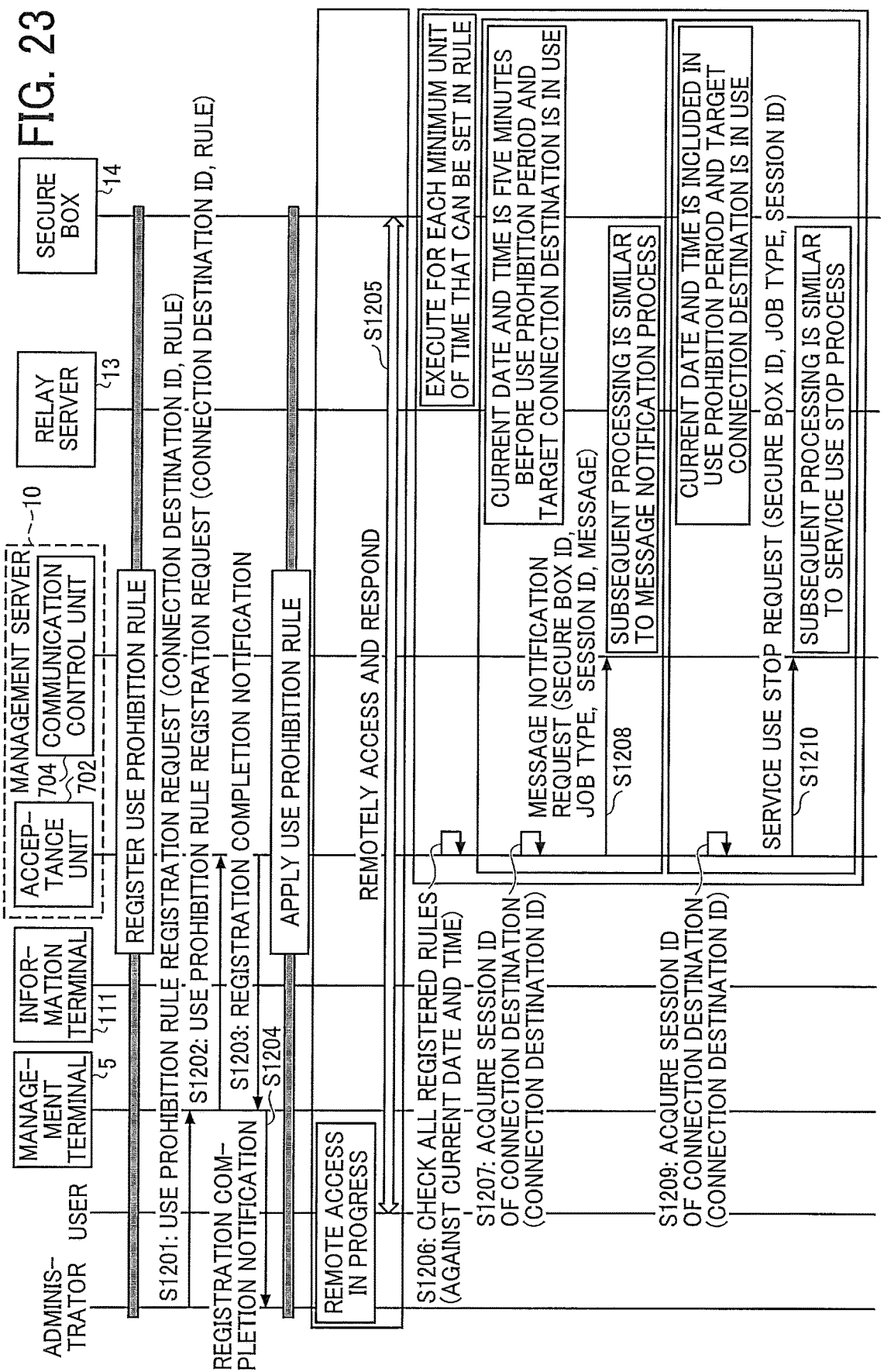

FIG. 24

| USE PROHIBITION RULE |
| --- |

CONNECTION DESTINATION: GROUP SHARED PC
START TIME 1:00 ▶   END TIME 4:00 ▶
REPETITION   ○NO  ⦿YES
UNIT OF REPETITION WEEKLY: SATURDAY ▶
START DATE 2020/1/1 ▶   END DATE 2020/12/31 ▶
NOTIFICATION SETTING ○NO  ⦿YES
NOTIFICATION TIME 5 MINUTES BEFORE ▶
NOTIFICATION MESSAGE
COMMUNICATION WILL BE DISCONNECTED SOON
BECAUSE OF THE PERIODIC MAINTENANCE.

CANCEL    OK

COMMUNICATION SYSTEM, INFORMATION PROCESSING APPARATUS, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2021-069184, filed on Apr. 15, 2021, in the Japan Patent Office, the entire disclosure of which is hereby incorporated by reference herein.

BACKGROUND

Technical Field

The present disclosure relates to a communication system, an information processing apparatus, and an information processing method.

Description of the Related Art

With recent trends such as workstyle reforms and the prevalence of remote work, a remote connection service has been increasingly recognized that allows an information terminal to connect to a connection-destination device such as a personal computer (PC), a server, or an image forming apparatus connected to a company's private network inside a firewall from an external network. In the technology of such a remote connection service, a technique that allows a user to operate an information terminal connected to an external network to activate a connection-destination device connected to a company's private network and a technique that allows the user to check the activation state of the connection-destination device or an assigned IP address are disclosed.

However, the techniques of the related art do not involve the transmission of messages to an information terminal connected to a connection-destination device.

For example, in a case where an administrator temporarily disconnects the network due to the occurrence of an incident or due to an operation such as maintenance, an information terminal that is under remote connection is identified and notified that the network is to be disconnected to prevent a reduction in the user's usability.

SUMMARY

A communication system according to an aspect of the present disclosure includes first circuitry that connects an information terminal connected to a first network to a connection-destination device connected to a second network different from the first network and transmits a message to the information terminal connected to the connection-destination device, based on information related to a use state of the connection-destination device.

An information processing apparatus according to an aspect of the present disclosure includes circuitry that connects an information terminal connected to a first network to a connection-destination device connected to a second network different from the first network and transmits a message to the information terminal connected to the connection-destination device, based on information related to a use state of the connection-destination device.

An information processing method according to an aspect of the present disclosure includes connecting an information terminal connected to a first network to a connection-destination device connected to a second network different from the first network; and transmitting a message to the information terminal connected to the connection-destination device, based on information related to a use state of the connection-destination device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a table (remote desktop service connection destination list) illustrating an example of information managed by the communication system according to an embodiment;

FIG. 9 is a table (fax service connection destination list) illustrating an example of information managed by the communication system according to an embodiment;

FIG. 10 is a table (user list) illustrating an example of information managed by the communication system according to an embodiment;

FIG. 11 is a table (secure box list) illustrating an example of information managed by the communication system according to an embodiment;

FIG. 12 is a table (access policy list) illustrating an example of information managed by the communication system according to an embodiment;

FIG. 13 is a sequence diagram illustrating an example process for starting a session of a remote desktop service according to an embodiment;

FIG. 15 is a sequence diagram illustrating an example message notification process according to an embodiment;

FIG. 16 is a view illustrating an example of a management screen for selecting a message transmission destination according to an embodiment;

FIG. 17 is a view illustrating an example of an input box for entering a message to be transmitted according to an embodiment;

FIG. 18 is a view illustrating an example of a message display screen according to an embodiment;

FIG. 19 is a sequence diagram illustrating an example service use stop process according to an embodiment;

FIG. 20 is a view illustrating an example of a request box for stopping the use of a service according to an embodiment;

FIG. 22 is a table illustrating an example of a use prohibition rule for each connection destination according to an embodiment;

FIG. 23 is a sequence diagram illustrating an example control process under a use prohibition rule according to an embodiment; and FIG. 24 is a view illustrating an example of a rule creation screen for creating a use prohibition rule according to an embodiment.

Figure 1:
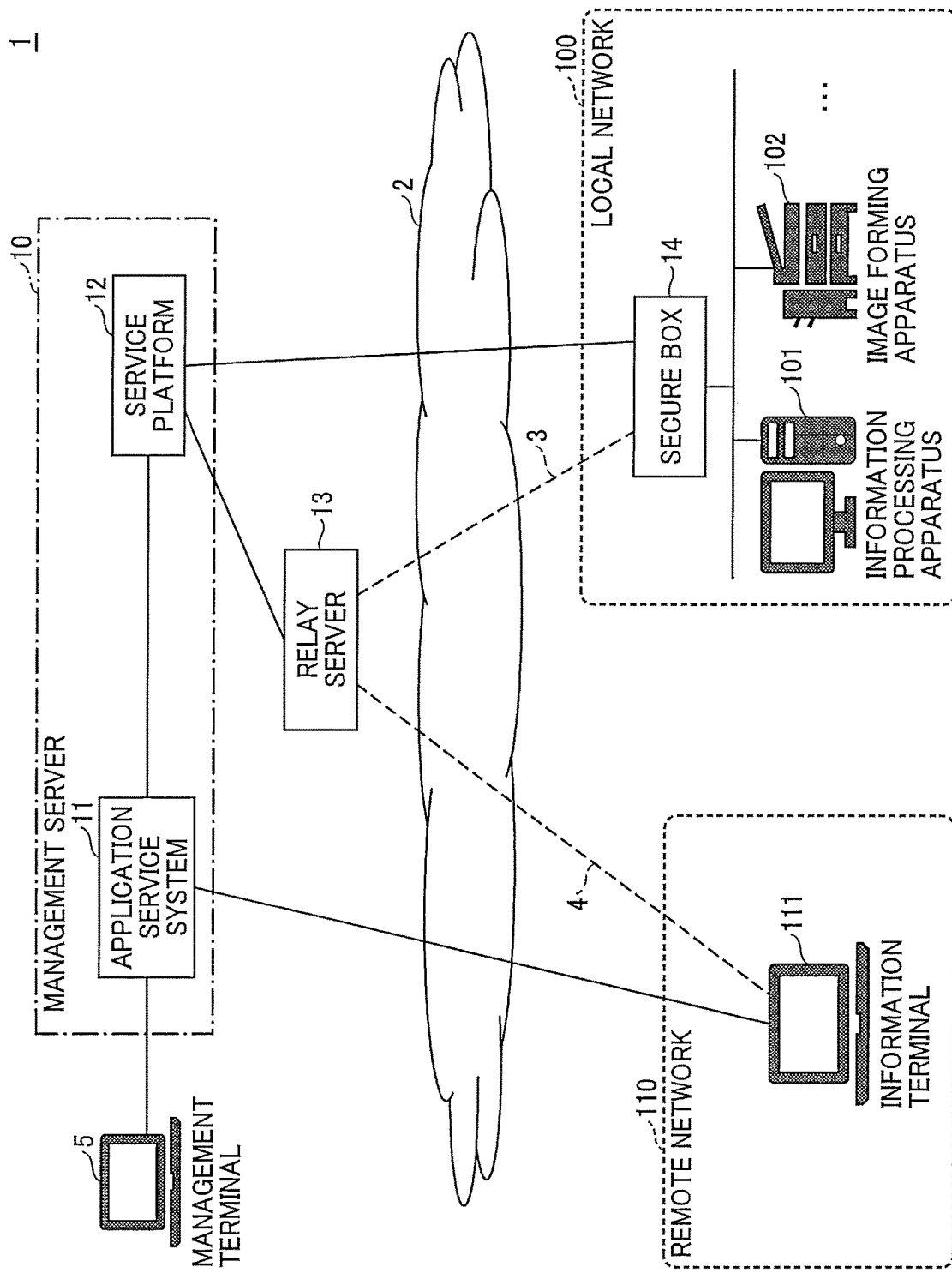
FIG. 1 is a diagram illustrating an example system configuration of a communication system according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise.

A communication system, an information processing apparatus, an information processing method, and a program according to embodiments of the present disclosure will be described in detail hereinafter with reference to the accompanying drawings.

In one or more embodiments of the present disclosure, a user's use state of a service such as a remote desktop service is managed to notify the user of a message while the user is using the service or to force the user to terminate the use of the service.

System Configuration

FIG. 1 is a diagram illustrating an example system configuration of a communication system 1 according to an embodiment. The communication system 1 includes, for example, an application service system 11, a service platform 12, a relay server 13, and a secure box 14. The application service system 11, the service platform 12, and the relay server 13 are connected to a communication network 2 such as the Internet, and the secure box 14 is connected to a local network 100. The communication system 1 is a system for allowing a user to use electronic devices (referred to as "connection-destination devices") such as an information processing apparatus 101 and an image forming apparatus 102 connected to the local network 100 from an information terminal 111 connected to an external network such as a remote network 110.

The local network 100 is a network such as an in-house local area network (LAN) having, for example, a firewall to restrict access from external networks such as the communication network 2 and the remote network 110. The local network 100 is an example of a second network different from a first network.

In FIG. 1, it is assumed that the service platform 12 and the secure box 14 are set in advance to be capable of communicating with each other. It is also assumed that access from the information terminal 111, the relay server 13, and the like to the secure box 14, the information processing apparatus 101, the image forming apparatus 102, and the like in the local network 100 is prohibited or unavailable.

In this embodiment, by way of example, but not limitation, a remote desktop server and a facsimile (fax) server are used as connection destinations. Any device server having data transmittable to or receivable from the information terminal 111 as an access source through protocol conversion in the secure box 14 according to an embodiment of the present disclosure may be used as a connection destination. In the following, it is assumed that the remote desktop server is used as a connection destination unless otherwise specified. A service from the remote desktop server as a connection destination is referred to as a "remote desktop service", and a service from the fax server as a connection destination is referred to as a "fax service".

The application service system 11 provides the remote connection service to the information terminal 111 as an access source via a web user interface (UI) supporting authentication. Further, the application service system 11 provides information on the relay server 13 in response to a request to use the remote connection service. The application service system 11 has the following main roles:

providing a web UI (a way of use according to a service and various management functions);

managing information (users and services/connection destinations, the secure box 14, policies, etc.);

providing an instruction to the secure box 14 (to change settings and connect to a relay server); and providing an instruction to a user who is using a service (notifying the user of a message and controlling the use of the service).

In response to an instruction from the application service system 11, the secure box 14 connects to the relay server 13, and performs relaying and/or protocol conversion of an operation performed on the connection destination by using the information terminal 111 as the access source and a response from the connection destination to the information terminal 111 as the access source. That is, the information terminal 111 as the access source is remotely connected to an information processing apparatus, an electronic device, or the like as a connection destination via the secure box 14. The information terminal 111 as the access source performs operations based on instructions from the application service system 11, such as configuring a secure box, registering a device as a connection destination, and using the remote connection service.

The relay server 13 mediates the connection between the information terminal 111 as the access source and the secure box 14. The relay server 13 has the following main roles:

managing WebSocket sessions (between the browser of the information terminal 111 and the relay server 13 and between the secure box 14 and the relay server 13); and relaying data communication of a remote connection service between the browser of the information terminal 111 and the secure box 14.

The service platform 12 provides fundamental functions such as user/device authentication, two-way communication with the secure box 14, customer contract management, and data rake.

The remote network 110 is an example of an external network (first network) that is installed in, for example, a remote office and that is different from the local network 100. The information terminal 111 may not necessarily be connected to the remote network 110, and may be used at home or outdoors, for example, and connected to the communication network 2 such as the Internet. Alternatively, the information terminal 111 may be an application executed on a cloud system. In the following description, as an example, the information terminal 111 is connected to the remote network 110, which is a local network installed in a remote office or the like.

The information terminal 111 is an information processing apparatus having a web communication function such as a web browser for a device used by a user, for example, a PC, a tablet terminal, or a smartphone. The information terminal 111 is capable of accessing the application service system 11, the relay server 13, and the like via the remote network 110 and the communication network 2.

The information processing apparatus 101 is an information processing apparatus such as a PC connected to the local network 100, and provides the remote desktop service. The image forming apparatus 102 is an electronic device connected to the local network 100 and having an image forming function, such as a multifunction peripheral (MFP), and provides the fax service;

The information processing apparatus 101 and the image forming apparatus 102 are examples of an electronic device connected to the local network 100 and configured to provide a predetermined service. Examples of the electronic device connected to the local network 100 include output devices such as a projector (PJ), an interactive white board (IWB) capable of mutual communication, and a digital signage. Other examples of the electronic device include an industrial machine, an imaging device, a sound collection device, a medical device, a network home appliance, a smartphone, a tablet terminal, a game console, a personal digital assistant (PDA), and a digital camera. Further examples of the electronic device include virtual electronic devices such as a virtual server.

The application service system 11 is, for example, a system including an information processing apparatus having the configuration of a computer or a plurality of information processing apparatuses. The application service system 11 has, for example, a function of a web server that uses the communication system 1 to provide, to the information terminal 111 and the like, a web page for using an electronic device such as the information processing apparatus 101 or the image forming apparatus 102 in the local network 100. For example, the application service system 11 also has a function of providing a web page for performing setting on the communication system 1 to a management terminal 5 or the like. The management terminal 5 is an information terminal used by an administrator or the like who manages the communication system 1.

The service platform 12 is, for example, a system including an information processing apparatus having the configuration of a computer or a plurality of information processing apparatuses. The service platform 12 operates in cooperation with the application service system 11 to execute an information management process for managing various types of setting information related to the communication system 1 and a communication control process for controlling the secure box 14 and the like.

The application service system 11 and the service platform 12 may be included in a management server 10, for example. The application service system 11 and the service platform 12 may have various system configurations. In the following description, the application service system 11 and the service platform 12 are sometimes referred to simply as the management server 10 without distinction from each other.

The relay server 13 is, for example, a system including an information processing apparatus having the configuration of a computer or a plurality of information processing apparatuses. The relay server 13 relays communication between the information terminal 111 and the secure box 14 (or the local network 100).

The secure box 14 is, for example, a communication control apparatus (or an information processing apparatus) having the configuration of a computer. The secure box 14 is connected to the relay server 13 under the control of the management server 10 and relays remote access from the information terminal 111 to an electronic device connected to the local network 100:

The management terminal 5 is, for example, an information terminal having a web communication function such as a web browser, and is used by the administrator or the like who manages the communication system 1. The management terminal 5 may be referred to as a terminal apparatus.

In the system configuration described above, the information terminal 111 is connected to the communication network 2 via the remote network 110. However, the information terminal 111 is not allowed to access the information processing apparatus 101 or the image forming apparatus 102 connected to the local network 100.

In this embodiment, the communication system 1 provides remote access from the information terminal 111 connected to the remote network 110 to the information processing apparatus 101, the image forming apparatus 102, or any other apparatus connected to the local network 100.

Overview of Operation

A user who uses the information terminal 111 uses, for example, a web browser included in the information terminal 111 to access a predetermined web resource provided by the management server 10. The user selects a service to be used (e.g., the remote desktop service for the information processing apparatus 101) from the web resource. The user may use, instead of the web browser included in the information terminal 111, an application program (hereinafter referred to as an application) for the communication system 1, which has a web communication function, to access the predetermined web resource.

In response to receipt of a connection request from the management terminal 5 and the information terminal 111, the management server 10 generates (issues) a session ID, which is identification information identifying a session, and notifies the secure box 14 of the generated session ID to request the secure box 14 to connect to the relay server 13. The management server 10 further notifies the requesting information terminal 111 of the issued session ID. Further, the management server 10 stores the session ID in a remote desktop service connection destination list 331. Accordingly, the management server 10 can refer to the remote desktop service connection destination list 331 to identify a session ID from a connection destination ID. ID is an abbreviation of identification. An ID is represented by numerals, alphabets, symbols, or the like. An ID may be referred to as an identifier. The same applies to an ID other than a session ID.

In response to the request from the management server 10, the secure box 14 connects to the relay server 13 via encrypted first communication 3 by using the notified session ID. For example, the secure box 14 connects to the relay server 13 via the first communication 3 using WebSocket over Hypertext Transfer Protocol Secure (HTTPS) (hereinafter referred to as wss).

Further, the information terminal 111 connects to the relay server 13 via encrypted second communication 4 by using the session ID notified by the management server 10. For example, the information terminal 111 connects to the relay server 13 via the second communication 4 using wss.

The relay server 13 performs a relay between the first communication 3 and the second communication 4, which are connected to the relay server 13 using the same session ID (connection information). For example; the relay server 13 performs tunneling between the first communication 3 and the second communication 4 to communicably connect the information terminal 111 and the secure box 14 to each other.

Through the process described above, the information terminal 111 is capable of connecting to the local network 100 via wss.

The secure box 14 has a protocol conversion function that enables the information terminal 111 to control an electronic device such as the information processing apparatus 101 or the image forming apparatus 102 connected to the local network 100. The protocol conversion according to this embodiment converts a protocol at the transport layer and the application level, and is different from, for example, protocol conversion for a lower layer, which is executed by a gateway or the like.

According to this embodiment, in the communication system 1 that allows the information terminal 111 to remotely access an electronic device connected to the local network 100, various existing electronic devices can be used from the information terminal 111.

The system configuration of the communication system 1 illustrated in FIG. 1 is an example. For example, the information terminal 111 may be connected to, instead of the remote network 110, the communication network 2 or any network connectable to the communication network 2. The relay server 13 may be included in the management server 10. The communication system 1 may include a plurality of relay servers 13 or a plurality of secure boxes 14. The communication network 2 may include, for example, a connection section for mobile communication or wireless communication such as a wireless LAN.

Hardware Configuration

The management server 10, the application service system 11, the service platform 12, the relay server 13, the secure box 14, the information processing apparatus 101, the information terminal 111, the management terminal 5, and the like illustrated in FIG. 1 are implemented by one or more computers. The hardware configuration of a typical computer will be described.

Figure 2:
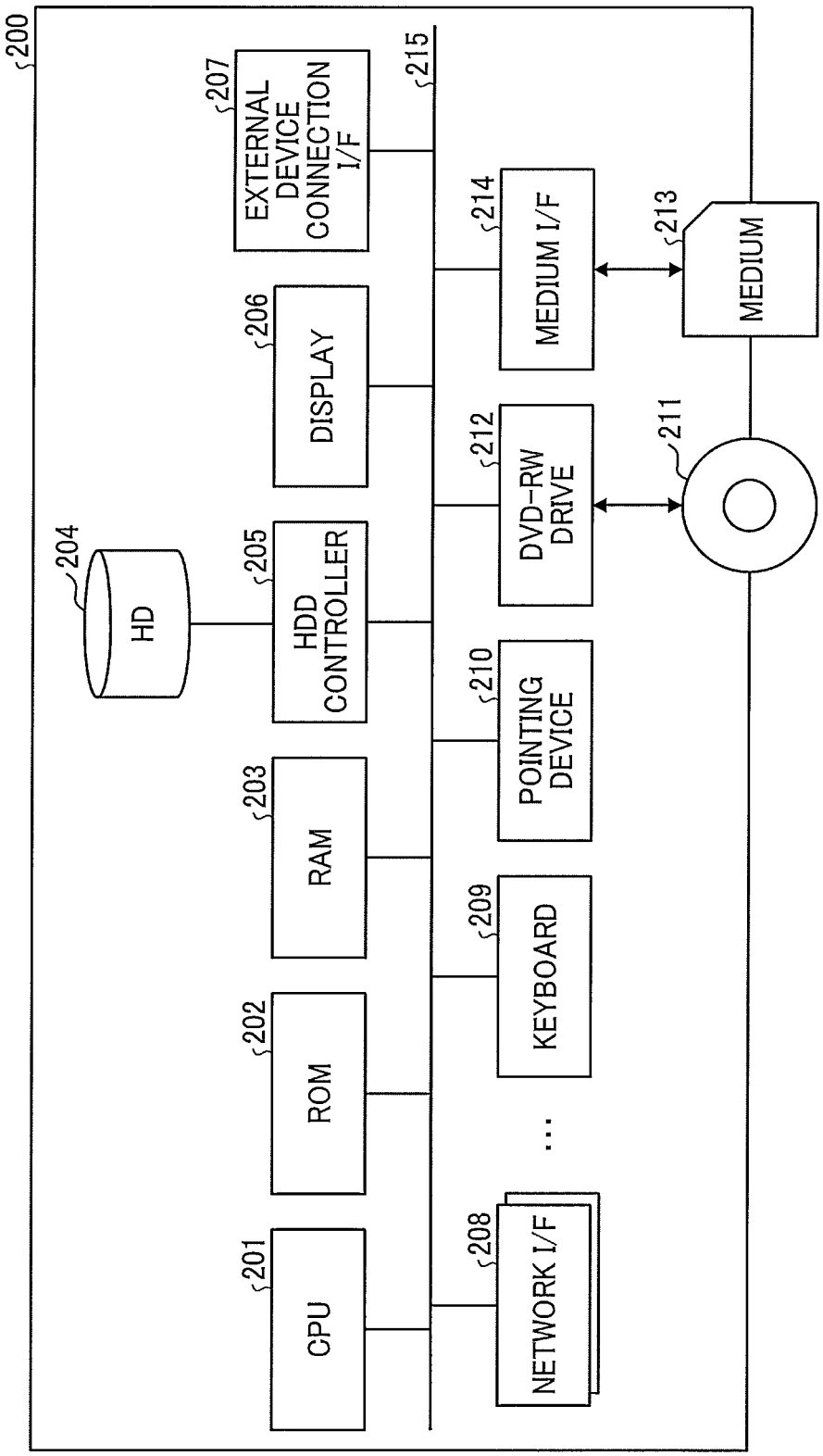
FIG. 2 is a diagram illustrating an example hardware configuration of a computer according to an embodiment.

FIG. 2 is a diagram illustrating an example hardware configuration of a computer 200 according to an embodiment. For example, as illustrated in FIG. 2, the computer 200 includes a central processing unit (CPU) 201, a read only memory (ROM) 202, a random access memory (RAM) 203, a hard disk (HD) 204, a hard disk drive (HDD) controller 205, a display 206, an external device connection interface (I/F) 207, one or more network I/Fs 208, a keyboard 209, a pointing device 210, a digital versatile disc rewritable (DVD-RW) drive 212, a medium I/F 214, and a bus line 215: The hardware configuration of the computer 200 illustrated in FIG. 2 is an example. Not all of the hardware elements described above may be included in the computer 200.

The CPU 201 controls the overall operation of the computer 200. The ROM 202 stores, for example, a program used to activate the computer 200, such as an initial program loader (IPL). The RAM 203 is used as, for example, a work area or the like for the CPU 201. The HD 204 stores, for example, programs such as an operating system (OS), an application, and a device driver, and various data. The HDD controller 205 controls reading or writing of various data from or to the HD 204 under the control of the CPU 201.

The display 206 displays various types of information such as a cursor, a menu, a window, text, or an image, for example. The display 206 may be disposed outside the computer 200. The external device connection I/F 207 is an interface such as a Universal Serial Bus (USB) or Recommended Standard (RS)-232C interface that connects various external devices such as an electronic device, a measurement device, and an external storage device to the computer 200. The one or more network I/Fs 208 are an interface or interfaces for performing data communication using, for example, the communication network 2, the local network 100, the remote network 110, or the like.

The keyboard 209 is a type of input device provided with a plurality of keys for entering text, numerical values, or various instructions, for example. The pointing device 210 is a type of input device for selecting or executing various instructions, selecting a target for processing, or moving the cursor being displayed, for example. The keyboard 209 and the pointing device 210 may be disposed outside the computer 200.

The DVD-RW drive 212 controls reading or writing of various data from or to a DVD-RW 211, which is an example of a removable recording medium. The removable recording medium is not limited to the DVD-RW 211 and may be a digital versatile disc recordable (DVD-R) or the like. The medium I/F 214 controls reading or writing (storing) of data from or to a medium 213 such as a flash memory. The bus line 215 includes an address bus; a data bus, various control signals, and the like for electrically connecting the components described above.

Software Configuration

An example software configuration of the application service system 11, the service platform 12, and the relay server 13 will be described.

Software Configuration of Application Service System

Figure 3:
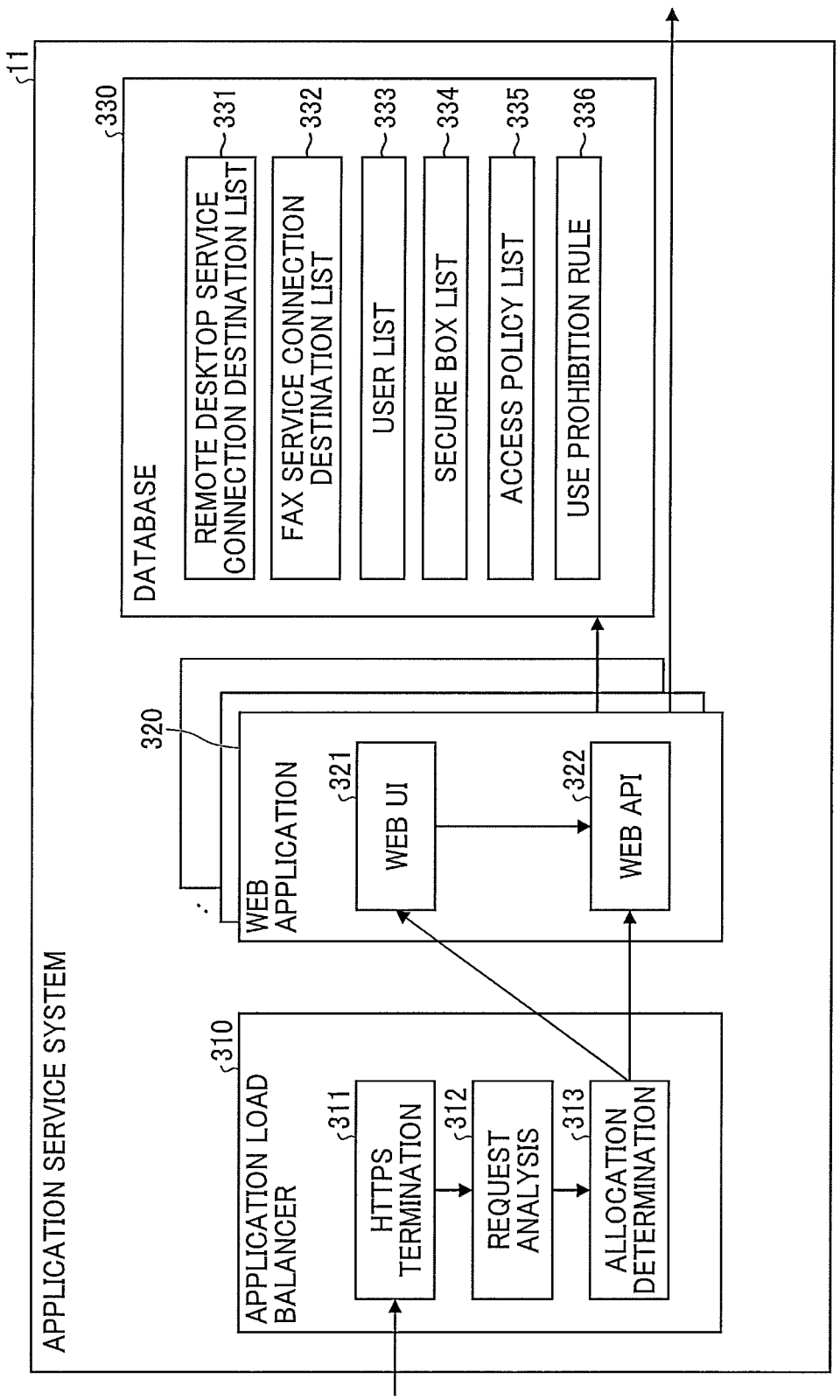
FIG. 3 is a diagram illustrating an example software configuration of an application service system according to an embodiment.

FIG. 3 is a diagram illustrating an example software configuration of the application service system 11 according to an embodiment. The application service system 11 accepts an HTTPS connection from the information terminal 111 as an access source. For example, as illustrated in FIG. 3, the application service system 11 includes an application load balancer 310, one or more web applications 320, and a database 330.

For example, the application load balancer 310 has functions such as https termination 311, request analysis 312, and allocation determination 313. The https termination 311 connects to another apparatus or system via HTTPS to perform an encryption process and a decryption process and transmit and receive data. The request analysis 312 decomposes the received data to obtain an HTTP header. The allocation determination 313 determines the allocation of the received data in accordance with the uniform resource locator (URL) included in the HTTP header obtained by the decomposition and other information, for example.

Each of the one or more web applications 320 includes, for example, a web UI 321 and a web application program interface (API) 322. The web UI 321 provides, to the information terminal 111 or the like connected to the application service system 11, a web page for displaying, for example, an operation screen or a setting screen. The web API 322 executes various processes corresponding to operations accepted by the web UI 321. The processes include, for example, communication control, issuance of a session ID, and update of the database 330. Each of the one or more web applications 320 may execute an internal process to access the database 330 via the web API 322 or directly access the database 330.

Each of the one or more web applications 320 may have a plurality of instances to obtain a redundant configuration or may have a single instance. In FIG. 3, the application service system 11 is implemented by Infrastructure as a Service (IaaS), by way of example. Alternatively, the application service system 11 may be implemented by Function as a Service (FaaS).

The database 330 stores information such as the remote desktop service connection destination list 331, a fax service connection destination list 332, a user list 333, a secure box list 334, an access policy list 335, and a use prohibition rule 336, which will be described below.

Software Configuration of Service Platform

Figure 4:
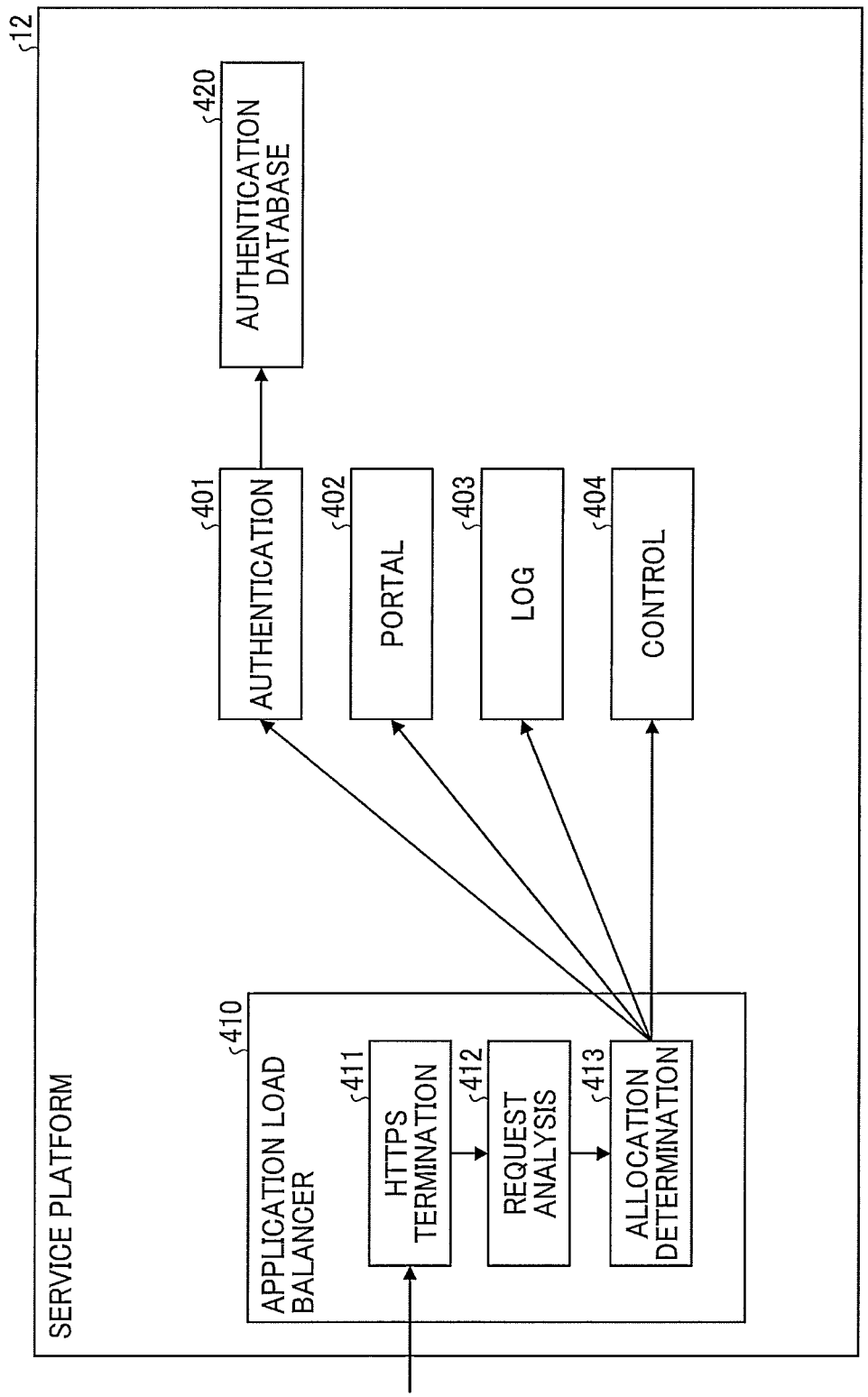
FIG. 4 is a diagram illustrating an example software configuration of a service platform according to an embodiment.

FIG. 4 is a diagram illustrating an example software configuration of the service platform 12 according to an embodiment. For example, as illustrated in FIG. 4, the service platform 12 includes an application load balancer 410, an authentication database 420, and subsystems. The subsystems include an authentication subsystem 401, a portal subsystem 402, a log subsystem 403, and a control subsystem 404.

The configuration of the application load balancer 410 may be similar to that of the application load balancer 310 described in the application service system 11, and the description thereof will thus be omitted. The authentication database 420 stores authentication information to be used in the authentication process, such as a password of each user.

The authentication subsystem 401 authenticates a user, a device such as the secure box 14, or the like. For example, the authentication subsystem 401 performs authentication using a user name and a password, authentication using an electronic certificate, or multi-factor authentication. The portal subsystem 402 provides a portal site for using various services provided by the communication system 1. The log subsystem 403 manages, for example, predetermined log information such as an access log and a setting log in the communication system 1.

For example, the control subsystem 404 is constantly connected to the secure box 14 and communicates an instruction from the management server 10, such as an instruction for connecting to the relay server 13, setting information, or the like to the secure box 14. The constant connection between the control subsystem 404 and the secure box 14 is implemented using, for example, MQTT over WebSocket over HTTPS or the like such that a connection is established from the secure box 14 to the control subsystem 404. MQTT stands for Message Queue Telemetry Transport: This method enables the secure box 14 to connect to the management server 10 without changing the settings of the firewall of the local network 100.

Functional Configuration of Management Server

Figure 5:
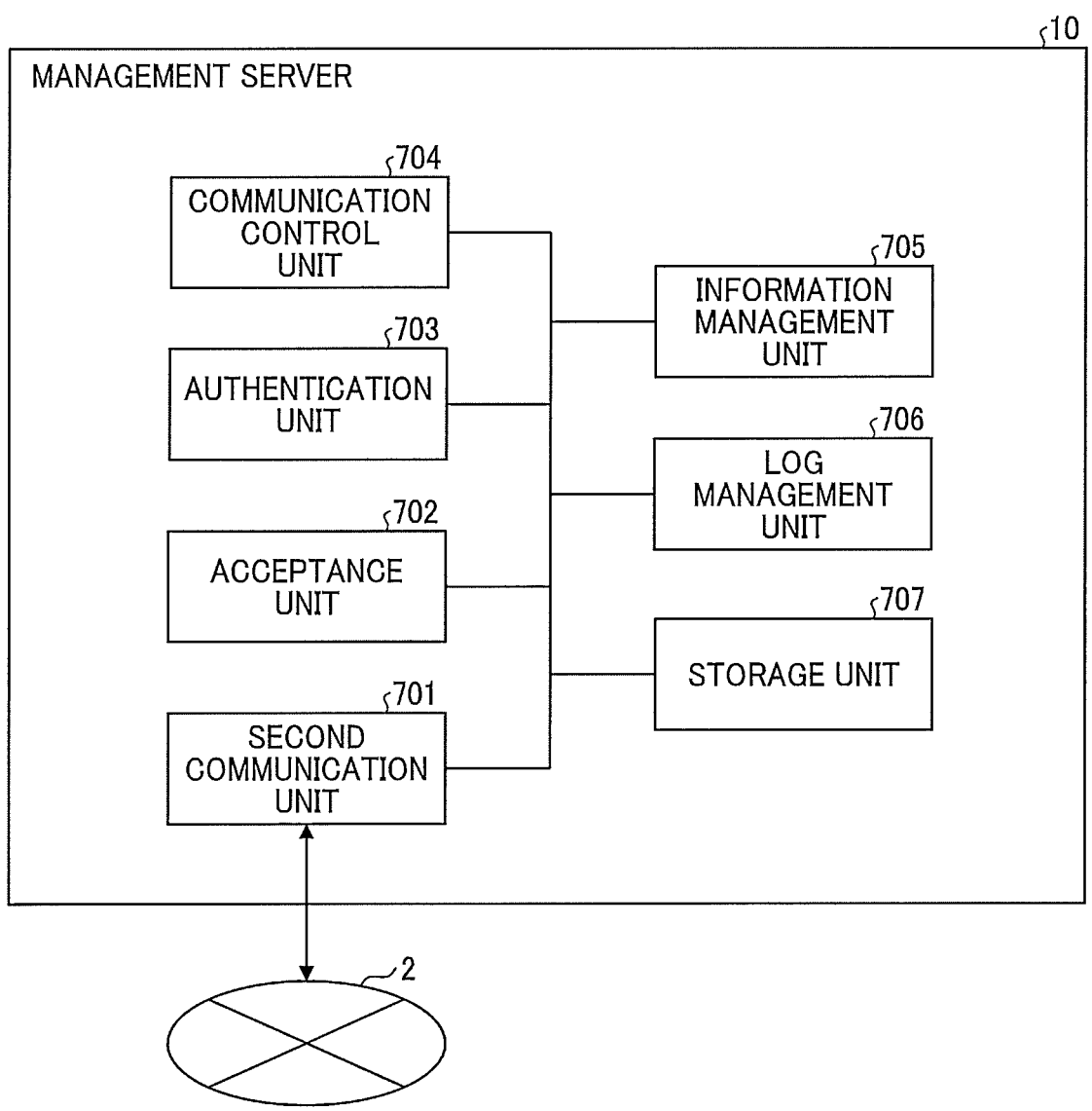
FIG. 5 is a diagram illustrating an example functional configuration of a management server according to an embodiment.

FIG. 5 is a diagram illustrating an example functional configuration of the management server 10 according to an embodiment. In the management server 10, for example, the computer 200 executes a predetermined program to implement a second communication unit 701, an acceptance unit 702, an authentication unit 703, a communication control unit 704, an information management unit 705, a log management unit 706, and a storage unit 707. At least some of the functions described above may be implemented by hardware.

For example, the second communication unit 701 connects the management server 10 to the communication network 2 using the one or more network I/Fs 208 to communicate with another apparatus.

The acceptance unit 702 is implemented by, for example, the application service system 11, the portal subsystem 402, and the like, which are executed by the computer 200, and accepts a connection request from the information terminal 111 or request information from the management terminal 5, such as a message notification request, a service use stop request, or a setting request. For example, in response to receipt of a connection request from the information terminal 111 to connect to an electronic device, the acceptance unit 702 also executes a process for generating a session ID or the like (an example of connection information) for connecting to the relay server 13 and notifying the information terminal 111 of the session ID or the like. Further, the acceptance unit 702 stores the generated session ID in the remote desktop service connection destination list 331. The authentication unit 703 is implemented by, for example, the authentication subsystem 401 or the like executed by the computer 200, and authenticates a user who uses the information terminal 111, an administrator or the like who uses the management terminal 5, the secure box 14, or the like. The authentication unit 703 may perform authentication using, for example, an external authentication server or the like.

The communication control unit 704 is implemented by, for example, the control subsystem 404 or the like executed by the computer 200, and connects the secure box 14 to the relay server 13 via the encrypted first communication 3 in response to a connection request from the information terminal 111. For example, the communication control unit 704 is constantly connected to the secure box 14, and, in response to the acceptance unit 702 accepting a connection request from the information terminal 111, notifies the secure box 14 of a session ID (an example of connection information) to request the secure box 14 to connect to the relay server 13.

The information management unit 705 stores and manages various types of information, which are managed by the communication system 1, in the storage unit 707 or the like. The information managed by the information management unit 705 will be described below.

The log management unit 706 is implemented by, for example, the log subsystem 403 or the like executed by the computer 200, and, in response to the occurrence of a predetermined event, records log information in a format corresponding to the event that has occurred.

The storage unit 707 is implemented by, for example, a storage device such as the HD 204 included in the computer 200, or a storage server, and stores various types of information such as information managed by the information management unit 705 and log information managed by the log management unit 706.

Functional Configuration of Secure Box

Figure 6:
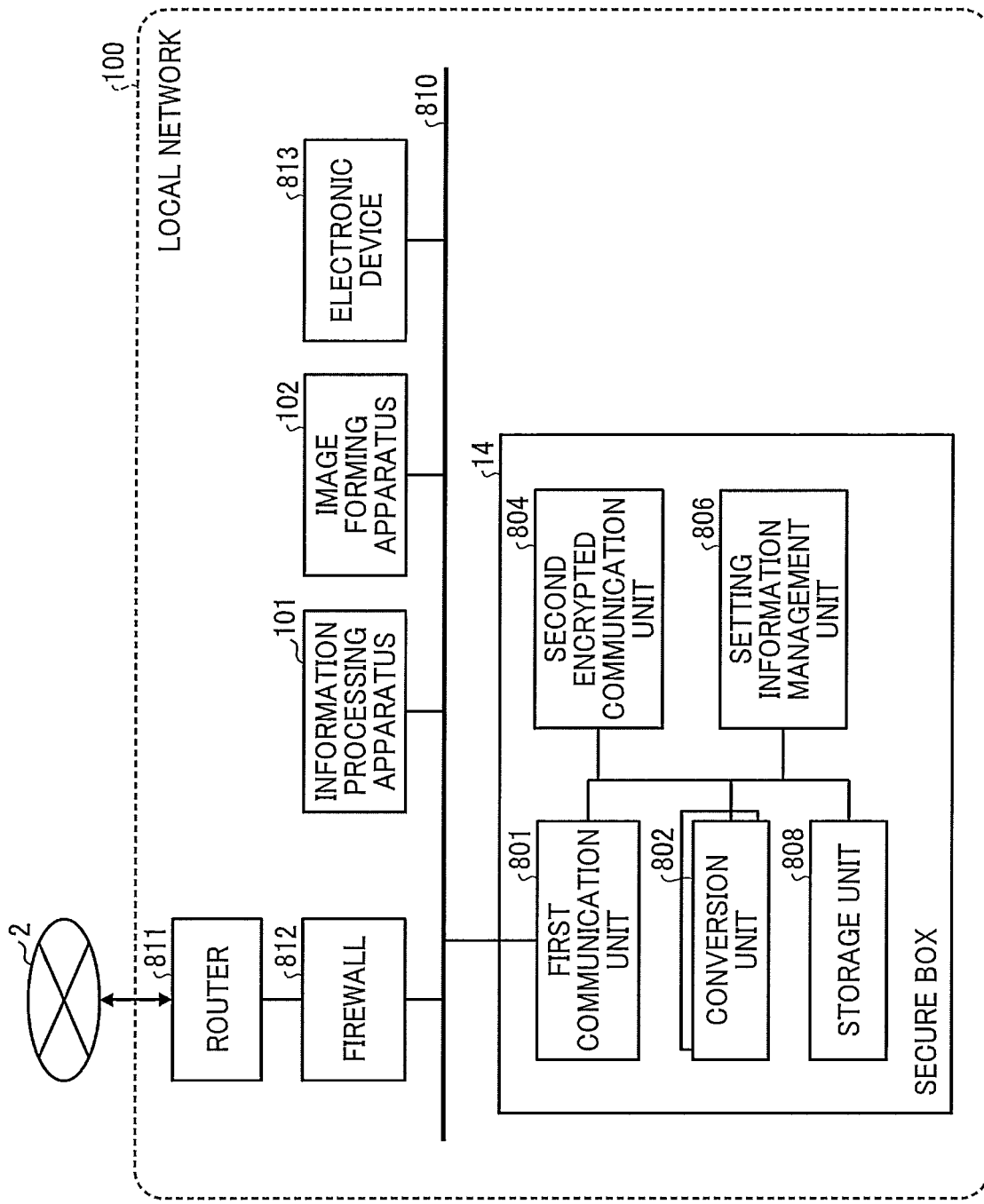
FIG. 6 is a diagram illustrating an example functional configuration of a secure box according to an embodiment.

FIG. 6 is a diagram illustrating an example functional configuration of the secure box 14 according to an embodiment. Before the description of the functional configuration of the secure box 14, an overview of an example of the local network 100 will be described. In the example illustrated in FIG. 6, the local network 100 includes a first local network 810. The first local network 810 is connected to the communication network 2 via a router 811 and a firewall 812. The first local network 810 is connected to the secure box 14, the information processing apparatus 101 configured to provide the remote desktop service, and the image forming apparatus 102 configured to provide an image forming service including the fax service, for example. The first local network 810 may also be connected to various electronic devices 813 in addition to the information processing apparatus 101 and the image forming apparatus 102.

Next, the functional configuration of the secure box 14 will be described. The secure box 14 is an example of a communication control apparatus including a conversion unit 802.

In the secure box 14, for example, the computer 200 executes a predetermined program to implement a first communication unit 801, one or more conversion units 802, a second encrypted communication unit 804, a setting information management unit 806, and a storage unit 808, for example. At least some of the functions described above may be implemented by hardware.

For example, the first communication unit 801 connects the secure box 14 to the first local network 810 using the one or more network I/Fs 208 to communicate with another apparatus.

The one or more conversion units 802 are implemented by, for example, protocol conversion of the remote desktop protocol (RDP) and protocol conversion of fax, which are applications executed by the computer 200. As a result, the secure box 14 implements, for example, a conversion unit (RDP) 802 corresponding to the remote desktop service provided by the information processing apparatus 101, and a conversion unit (fax) 802 corresponding to the fax service provided by the image forming apparatus 102.

For example, the conversion unit (RDP) 802 corresponding to the remote desktop service converts a first protocol used by the information terminal 111 for remote access into a remote access protocol (second protocol) for using the remote desktop service. The conversion unit (fax) 802 corresponding to the fax service converts the first protocol used by the information terminal 111 for remote access into a web API or the like for using the fax service. As described above, the one or more conversion units 802 convert the first protocol used by the information terminal 111 for remote access into protocols for using predetermined functions provided by various electronic devices. The one or more conversion units 802 also convert the second protocol into the first protocol.

For example, the second encrypted communication unit 804 connects the secure box 14 or the one or more conversion units 802 to the relay server 13 via the encrypted first communication 3 under the control of the communication control unit 704.

The setting information management unit 806 is implemented by, for example, a program executed by the computer 200, and stores and manages setting information of the secure box 14 in the storage unit 808 or the like.

The storage unit 808 is implemented by, for example, a program executed by the computer 200 and a storage medium such as the HD 204, and stores various types of information such as setting information of the secure box 14.

Functional Configuration of Relay Server

Figure 7A:
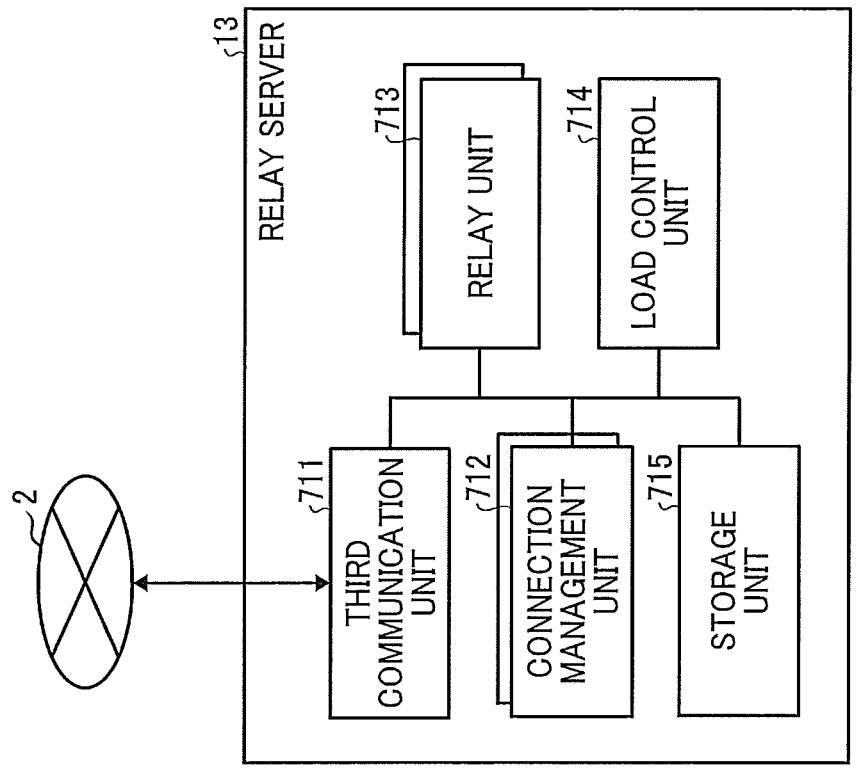
FIGS. 7A and 7B illustrate an example of a relay server and an example of a management terminal and an information terminal, respectively, according to an embodiment.

FIG. 7A illustrates an example functional configuration of the relay server 13 according to an embodiment.

In the relay server 13, for example, the CPU 201 of the computer 200 included in the relay server 13 executes a predetermined program to implement a third communication unit 711, one or more connection management units 712, one or more relay units 713, and a load control unit 714, for example. At least some of the functions described above may be implemented by hardware. The storage unit 715 may be implemented by any desired memory such as the HD 204, ROM 202, or RAM 203.

For example, the third communication unit 711 connects the relay server 13 to the communication network 2 using the one or more network I/Fs 208 to communicate with another apparatus.

The one or more connection management units 712 are implemented by, for example, a program such as a reverse proxy executed by the computer 200, and manage connections between the first communication 3 and the second communication 4, which are relayed by the one or more relay units 713.

The one or more relay units 713 are implemented by, for example, a program such as a WebSocket server executed by the computer 200, and relay communication between the information terminal 111 and the local network (second network) 100. For example, the one or more relay units 713 establish a tunnel between the first communication 3 established with the secure box 14 and the second communication 4 established with the information terminal 111, using the same session ID, to perform a relay between the first communication 3 and the second communication 4.

The load control unit 714 executes a load control process for changing the number of relay units 713 or the processing capability of the one or more relay units 713 in accordance with the load of the one or more relay units 713.

Functional Configuration of Information Terminal

Figure 7B:
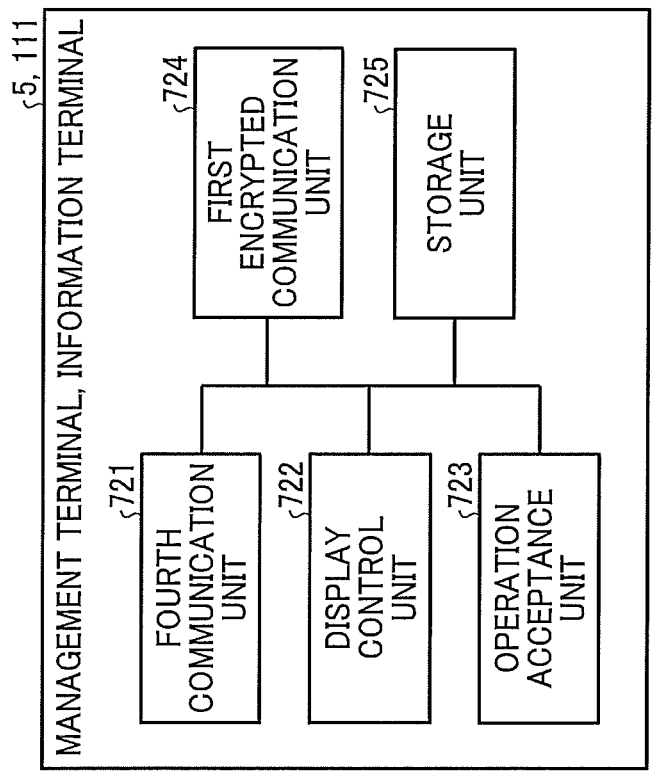

FIG. 7B illustrates an example functional configuration of the management terminal 5 and the information terminal 111 according to an embodiment. In the management terminal 5 and the information terminal 111, for example, the computer 200 included in each of the management terminal 5 and the information terminal 111 executes a predetermined program to implement a fourth communication unit 721, a display control unit 722, an operation acceptance unit 723, a first encrypted communication unit 724, and a storage unit 725, for example. At least some of the functions described above may be implemented by hardware.

For example, the fourth communication unit 721 connects the management terminal 5 and the information terminal 111 to the communication network 2 using the one or more network I/Fs 208 to communicate with another apparatus.

The display control unit 722 is implemented by, for example, a web browser or the like executed by the computer 200, and displays a display screen (such as a web UI or a Hyper Text Markup Language (HTML) screen) transmitted from the management server 10, the secure box 14, or the like. When the content to be displayed includes audio data or the like, the display control unit 722 also plays back audio, for example.

The operation acceptance unit 723 is implemented by, for example, a web browser or the like executed by the computer 200, and accepts an operation performed by the user (or administrator) or the like on a display screen displayed by the display control unit 722.

The first encrypted communication unit 724 is implemented by, for example, a web browser, an OS, or the like executed by the computer 200, and connects to the relay server 13 via the encrypted second communication 4 by using a session ID (connection information) notified by the management server 10.

The storage unit 725 is implemented by, for example, a program executed by the computer 200 and a storage medium such as the HD 204, and stores various types of information, data, or the like.

Information Managed by Communication System

Information managed by the communication system 1, namely, the database 330 included in the application service system 11, will be described in detail.

FIGS. 8 and 9 illustrate the remote desktop service connection destination list 331 and the fax service connection destination list 332 including information such as connection destinations for the remote desktop service and the fax service, respectively, according to an embodiment. The items in the lists 331 and 332 are common. The items will be described hereinafter.

The "connection destination ID" is an ID for uniquely identifying a connection destination.

The "name" is a name for allowing the administrator to identify the connection destination.

The "IP address/host name" is the Internet protocol (IP) address or the host name of the connection destination.

The "secure box" indicates the name of a secure box as the connection destination.

The "state" indicates whether the user is using the connection destination. The value "available" indicates a state where the user is not using the connection destination, and the value "in use" indicates a state where the user is using the connection destination.

The "user" is a display name of a user who is using the connection destination.

The "session ID" is an ID generated (or issued) when the user uses the connection destination.

The "last use date and time" indicates the date and time when the connection destination was last used.

FIG. 10 illustrates the user list 333 including information related to users.

The "user ID" is an ID uniquely identifying a user.

The "name" is a name for allowing the administrator to identify the user.

The "password" is a password used to authenticate a user who is to log into the system. A hashed value is stored to prevent the original password from being identified.

FIG. 11 illustrates the secure box list 334 including information of secure boxes.

The "secure box ID" is an ID identifying a secure box.

The "name" is a name for allowing the administrator to identify the secure box.

FIG. 12 illustrates the access policy list 335 including information on policies of networks.

The "policy ID" is an ID identifying a policy.

The "policy name" is a name for allowing the administrator to identify the policy.

The "priority" is a priority used when a plurality of policies are applied.

The "user ID" is a user ID of a user to which a policy is applied.

The "service" indicates a service to which the policy is applied.

The "action" indicates the content of an action executed by the policy.

The use prohibition rule 336 will be described in the description of a control process under a use prohibition rule described below.

Session Start Process

FIG. 13 is a sequence diagram illustrating an example process for starting a session of the remote desktop service according to an embodiment. The illustrated process is, for example, an example process for starting a session for performing communication between the secure box 14 located in the local network 100 and the information terminal 111 via the relay server 13, as illustrated in FIG. 1. In all of the subsequent sequence diagrams, the acceptance unit 702 and the communication control unit 704, which are functions in the management server 10, are illustrated. However, any other function such as the second communication unit 701 may execute processes. In one example, the second communication unit 701, instead of the acceptance unit 702, may transmit and receive a request or information.

In response to the user performing a portal screen display operation on the information terminal 111 in step S1601, the communication system 1 executes the processing of step S1602 and the subsequent processing.

In step S1602, in response to receipt of the portal screen display operation performed by the user, the operation acceptance unit 723 of the information terminal 111 requests the acceptance unit 702 of the management server 10 to display a portal screen.

In step S1603, the acceptance unit 702 of the management server 10 transmits the portal screen to the information terminal 111 in response to the request from the information terminal 111. As a result, in step S1604, the display control unit 722 of the information terminal 111 displays, for example, a portal screen 1810 illustrated in FIG. 14A.

Figure 14A:
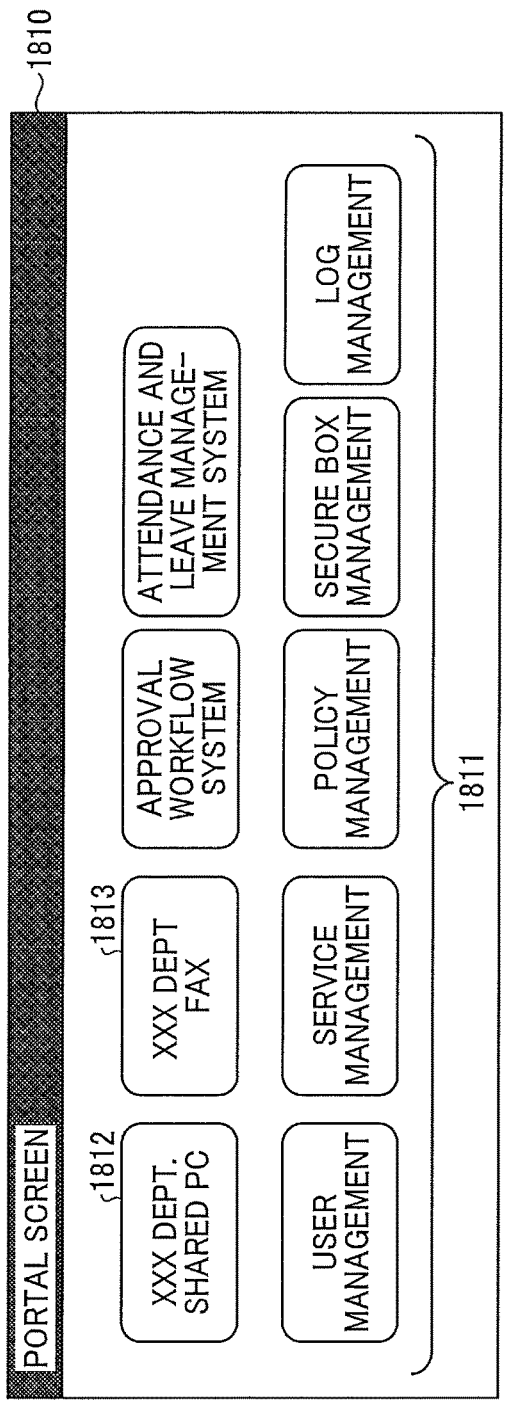
FIGS. 14A and 14B are views illustrating an example of a portal screen and a login screen, respectively, according to an embodiment.

FIG. 14A illustrates an image of an example of the portal screen 1810 displayed on the information terminal 111. In the example illustrated in FIG. 14A, the portal screen 1810 displays a plurality of icons 1811 for selecting a plurality of services or functions provided by the communication system 1. The user selects a "XXX Dept. shared PC" icon 1812 on the portal screen 1810 to select the remote desktop service provided by the information processing apparatus 101. The user selects a "XXX Dept. FAX" icon 1813 on the portal screen 1810 to select the fax service provided by the image forming apparatus 102.

In response to the user selecting a service and a connection destination from the portal screen 1810 in step S1605, the communication system 1 executes the processing of step S1606 and the subsequent processing.

In step S1606, in response to receipt of the service selection operation performed by the user, the operation acceptance unit 723 of the information terminal 111 sends a request for the selected service to the acceptance unit 702 of the management server 10.

In step S1607, the acceptance unit 702 of the management server 10 transmits a login screen corresponding to the requested service to the information terminal 111 in response to the request from the information terminal 111. As a result, in step S1608, the display control unit 722 of the information terminal 111 displays, for example, a login screen 1820 illustrated in FIG. 14B.

Figure 14B:
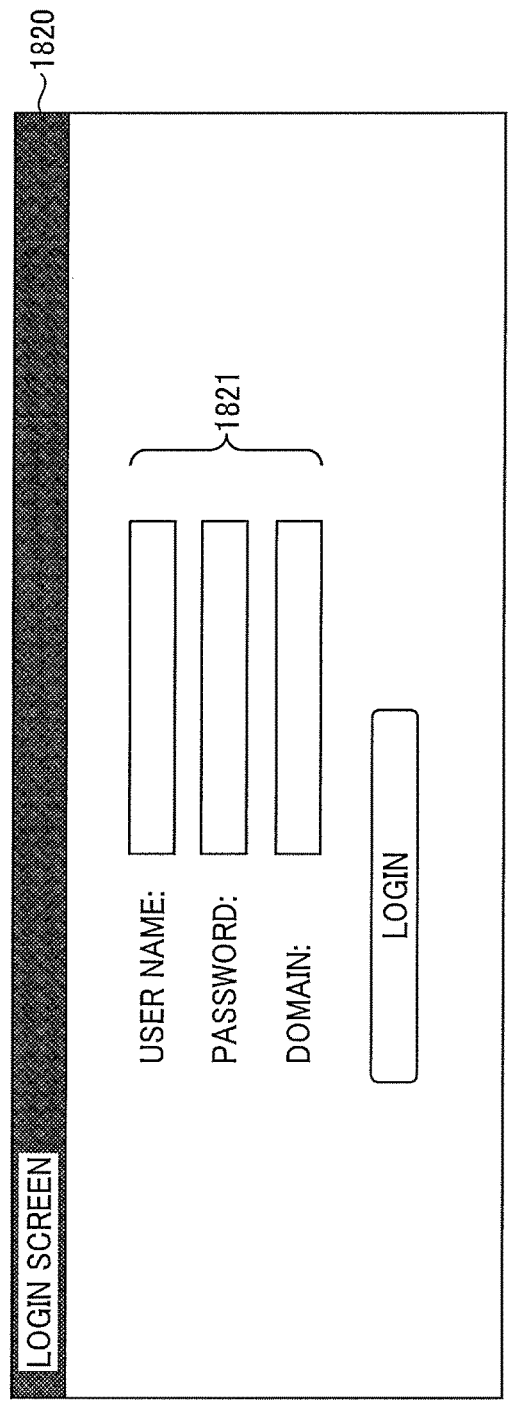

FIG. 14B illustrates an image of an example of the login screen 1820 provided by the management server 10. In the example illustrated in FIG. 14B, the login screen 1820 displays input fields for entering a user name, a password, and a domain as an example of login information input fields 1821.

In response to the user entering login information on the login screen 1820 in step S1609, the communication system 1 executes the processing of step S1610 and the subsequent processing.

In step S1610, in response to acceptance of the login information entered by the user, the operation acceptance unit 723 of the information terminal 111 transmits the accepted login information (e.g., a user name, a password, and a domain) to the acceptance unit 702 of the management server 10. Then, the authentication unit 703 of the management server 10 performs an authentication process, which will not be described herein because the authentication process is not directly related to the content of the present disclosure. Here, it is assumed that the login of the user is successful.

In step S1611, in response to receipt of the login information from the information terminal 111, the acceptance unit 702 of the management server 10 generates a session ID and notifies the communication control unit 704 of a connection request for connecting to the relay server 13. The connection request includes the generated session ID. Further, the acceptance unit 702 stores the session ID in the remote desktop service connection destination list 331.

In step S1612, the communication control unit 704 of the management server 10 transmits the connection request for connecting to the relay server 13, which includes the session ID, to the secure box 14.

In step S1613, the second encrypted communication unit 804 of the secure box 14 transmits the connection request including the session ID notified by the management server 10 to the relay server 13 via the first communication unit 801.

In step S1614, the second encrypted communication unit 804 of the secure box 14 establishes a session (the encrypted first communication 3) with the relay server 13.

In step S1615, the second encrypted communication unit 804 of the secure box 14 notifies the communication control unit 704 of the management server 10 of a connection notification indicating the establishment of a connection to the relay server 13. In step S1616, the communication control unit 704 notifies the acceptance unit 702 of the connection notification accepted from the secure box 14.

In step S1617, the acceptance unit 702 of the management server 10 transmits the session ID, which has been transmitted to the secure box 14, to the information terminal 111.

In step S1618, the first encrypted communication unit 724 of the information terminal 111 transmits a connection request including the session ID notified by the management server 10 to the relay server 13 via the fourth communication unit 721.

In step S1619, the first encrypted communication unit 724 of the information terminal 111 establishes a session (the encrypted second communication 4) with the relay server 13. As a result, in step S1620, the information terminal 111 and the secure box 14 participate in the same session provided by the relay server 13 and are allowed to transmit and receive data to and from each other via encrypted communication (e.g., wss).

Message Notification Process

Next, a process for the administrator to notify a user who is using the remote desktop service of any message will be described. FIG. 15 is a sequence diagram illustrating an example message notification process according to an embodiment.

In step S1000, the processing of steps S1601 to S1620 illustrated in the sequence diagram in FIG. 13 is executed to start a session of the remote desktop service, and, as a result, the user uses the service.

In step S1001, the administrator operates the operation acceptance unit 723 of the management terminal 5 to access the application service system 11 and execute a management screen display request.

In step S1002, the fourth communication unit 721 of the management terminal 5 transmits the management screen display request to the second communication unit 701 of the management server 10. The second communication unit 701 of the management server 10 transmits the received management screen display request to the acceptance unit 702. The acceptance unit 702 creates management screen information based on information related to the use state and the like of the connection destination included in the remote desktop service connection destination list 331 illustrated in FIG. 8, and transmits the management screen information to the second communication unit 701.

In step S1003, the second communication unit 701 of the management server 10 transmits the management screen information to the fourth communication unit 721 of the management terminal 5.

In step S1004, the fourth communication unit 721 of the management terminal 5 transmits the received management screen information to the display control unit 722. The display control unit 722 displays a management screen on the screen of the management terminal 5, based the received management screen information. The management screen allows the administrator to check the use state of the service.

In step S1005, the administrator executes a message notification request to transmit a message to a user who is using the remote desktop service.

FIG. 16 is a view illustrating an example of a management screen 1020 displayed on the screen of the management terminal 5 to select a message transmission destination. The management screen 1020 displays the items of the remote desktop service connection destination list 331 illustrated in FIG. 8. The administrator selects a "checkbox" 1031 for a connection destination for which a "use state" 1034 indicates "in use" to designate the connection destination to which the message is to be transmitted. To transmit the message to only the connection destination "secure box B", the administrator clicks the item name "secure box B" in a "secure box" 1033 and sorts secure boxes by type to easily select the corresponding connection destination. In response to pressing of a "Send Message" button 1035 displayed after the selection of the connection destination, a screen for entering a message to be transmitted is displayed. Alternatively, a plurality of connection destinations to which the message is to be forwarded may be selected to enable the execution of a request to simultaneously notify the plurality of connection destinations of the message. A "Forced Termination" button 1036 is pressed to forcibly stop the use of the service.

FIG. 17 illustrates an example of an input box 1021 displayed on the screen of the management terminal 5 to enter a message to be transmitted. In the illustrated example, the administrator enters, into a pop-up input box, a message indicating "Maintenance will start in 5 minutes". After entering the message, the administrator presses an "OK" button 1037 to execute a message notification request.

Referring back to FIG. 15, the operation will still be described. In step S1006, the fourth communication unit 721 of the management terminal 5 transmits a message notification request to the second communication unit 701 of the management server 10. The message notification request to be transmitted includes a connection destination ID corresponding to the connection destination designated by the administrator and the message to be transmitted, which is entered by the administrator. If a plurality of connection destinations are selected, a plurality of connection destination IDs are included in the message notification request.

In step S1007, the second communication unit 701 of the management server 10 transmits the received message notification request to the acceptance unit 702. The acceptance unit 702 acquires, from the remote desktop service connection destination list 331, a session ID corresponding to the connection destination ID included in the received message notification request. If a plurality of connection destination IDs are included in the message notification request, a plurality of session IDs each corresponding to a corresponding one of the plurality of connection destination IDs are acquired from the remote desktop service connection destination list 331.

In step S1008, the acceptance unit 702 transmits a message notification request to the communication control unit 704. The message notification request to be transmitted includes a secure box ID corresponding to the connection destination ID, a job type indicating "message communication", the acquired session ID, and a message to be transmitted.

In step S1009, the second communication unit 701 of the management server 10 transmits to the fourth communication unit 721 of the management terminal 5 a request completion notification indicating the completion of the message notification request.

In step S1010, the fourth communication unit 721 of the management terminal 5 transmits the received request completion notification to the display control unit 722. The display control unit 722 displays the request completion notification on the screen of the management terminal 5.

In step S1011, the communication control unit 704 identifies a destination secure box 14 from the secure box ID included in the received message notification request, and transmits a message notification request to the identified secure box 14. The message notification request to be transmitted includes a job type indicating "message communication", the session ID, and the message to be transmitted.

In step S1012, the first communication unit 801 of the secure box 14 transmits data including a message to the third communication unit 711 of the relay server 13. The message notification request to be transmitted includes a job type indicating "message communication", the session ID, and the message to be transmitted.

In step S1013, the third communication unit 711 of the relay server 13 transmits data including the message to the fourth communication unit 721 of the information terminal 111 identified by the session ID. If a plurality of connection destinations are designated, the data is transmitted to connection destinations identified by respective session IDs.

In step S1014, the fourth communication unit 721 of the information terminal 111 transmits the received message to the display control unit 722. The display control unit 722 displays the received message on the screen of the information terminal 111.

FIG. 18 illustrates an example of a message display screen 1022 displayed on the screen of the information terminal 111. The message "Maintenance will start in 5 minutes", which is entered by the administrator in step S1005, is displayed on the screen to notify the user of the message.

Referring back to FIG. 15, the operation will still be described. In step S1015, the first communication unit 801 of the secure box 14 transmits to the communication control unit 704 of the management server 10 a success notification indicating that the message notification is successful. The success notification includes a notification type indicating "successful message notification" and the session ID. If the message notification has failed for some reason, the notification type may be set to "message notification failure", and a notification indicating that the message notification has failed may be transmitted.

In step S1016, the communication control unit 704 transmits the received success notification to the acceptance unit 702. The success notification includes a notification type indicating "successful message notification" and the session ID. Further, the log management unit 706 may record the received success notification as a log in the following procedure. The acceptance unit 702 transmits the received success notification to the log management unit 706. The log management unit 706 transmits the received success notification to the storage unit 707 as a log. The storage unit 707 stores the received success notification.

Through the process described above, the communication system 1 is capable of managing a user's use state of a service and transmitting information related to the user's use state of the service to a management terminal of an administrator or an information terminal of the user. The administrator is able to check the presence or absence of a user for each service and information on a user who is using the service, such as the name of the user and a connection destination. The communication system 1 is also capable of notifying any user who is using a service of any message. A message notification may be transmitted not only by the administrator operating the management terminal 5 but also by any user operating the information terminal 111 in a similar procedure to notify the user of a message. A plurality of connection destinations may be designated to efficiently notify the plurality of connection destinations of a message simultaneously and collectively.

Service Use Stop Process

Next, a process for the administrator to stop a user from using the remote desktop service while the user is using the service will be described. FIG. 19 is a sequence diagram illustrating an example service use stop process according to an embodiment.

In step S1100, the processing of steps S1601 to S1620 illustrated in the sequence diagram in FIG. 13 is executed to start a session of the remote desktop service, and, as a result, the user uses the service.

In steps S1101 to S1104, a process similar to that in steps S1001 to S1004 illustrated in FIG. 15 is executed to display a management screen on the screen of the management terminal 5.

In step S1105, the administrator operates the operation acceptance unit 723 of the management terminal 5 to execute a service notification request to stop the user from using the remote desktop service while the user is using the service.

FIG. 20 illustrates an example of a request box 1120 displayed on the screen of the management terminal 5 to stop the use of a service. The request box 1120 is displayed in response to pressing of the "Forced Termination" button 1036 after a connection destination for which the use of the service is to be stopped is selected on the management screen 1020 illustrated in FIG. 16. Then, in response to pressing of an "OK" button 1038, a service use stop request is executed. A plurality of connection destinations for which the use of services is to be stopped may be selected to enable the execution of a request to simultaneously stop the use of the services for the plurality of connection destinations.

Referring back to FIG. 19, the operation will still be described. In step S1106, the fourth communication unit 721 of the management terminal 5 transmits a service use stop request to the second communication unit 701 of the management server 10. The service use stop request to be transmitted includes a connection destination ID corresponding to the connection destination designated by the administrator. If a plurality of connection destinations are selected, a plurality of connection destination IDs are included in the service use stop request.

In step S1107, the second communication unit 701 of the management server 10 transmits the received service use stop request to the acceptance unit 702. The acceptance unit 702 acquires, from the remote desktop service connection destination list 331, a session ID corresponding to the connection destination ID included in the received service use stop request. If a plurality of connection destination IDs are included in the service use stop request, a plurality of session IDs each corresponding to a corresponding one of the plurality of connection destination IDs are acquired from the remote desktop service connection destination list 331.

In step S1108, the acceptance unit 702 transmits a service use stop request to the communication control unit 704. The service use stop request to be transmitted includes a secure box ID corresponding to the connection destination ID, a job type indicating "service use stop", and the acquired session ID.

In step S1109, the second communication unit 701 of the management server 10 transmits to the fourth communication unit 721 of the management terminal 5 a request completion notification indicating the completion of the service use stop request.

In step S1110, the fourth communication unit 721 of the management terminal 5 transmits the received request completion notification to the display control unit 722. The display control unit 722 displays the request completion notification on the screen of the management terminal 5.

In step S1111, the communication control unit 704 identifies a destination secure box 14 from the secure box ID included in the received service use stop request, and transmits a service use stop request to the identified secure box 14. The service use stop request to be transmitted includes a job type indicating "service use stop" and the session ID.

In step S1112, the first communication unit 801 of the secure box 14 disconnects the session indicated by the session ID included in the received service use stop request. Examples of the method for disconnecting a session include stopping the first communication unit 801 from performing data transmission corresponding to a session ID indicating the session to be disconnected. In response to detecting no communication from the first communication unit 801 for a certain period of time using the session ID of the disconnected session, the third communication unit 711 of the relay server 13 detects the termination of the session.

In step S1113, the third communication unit 711 of the relay server 13 transmits a service use stop notification to the fourth communication unit 721 of the information terminal 111. If a plurality of connection destinations are designated, the service use stop notification is transmitted to each of the designated connection destinations.

In step S1114, the fourth communication unit 721 of the information terminal 111 transmits a service use stop notification, to the display control unit 722. The display control unit 722 displays the received service use stop notification on the screen of the information terminal 111.

Figure 21:
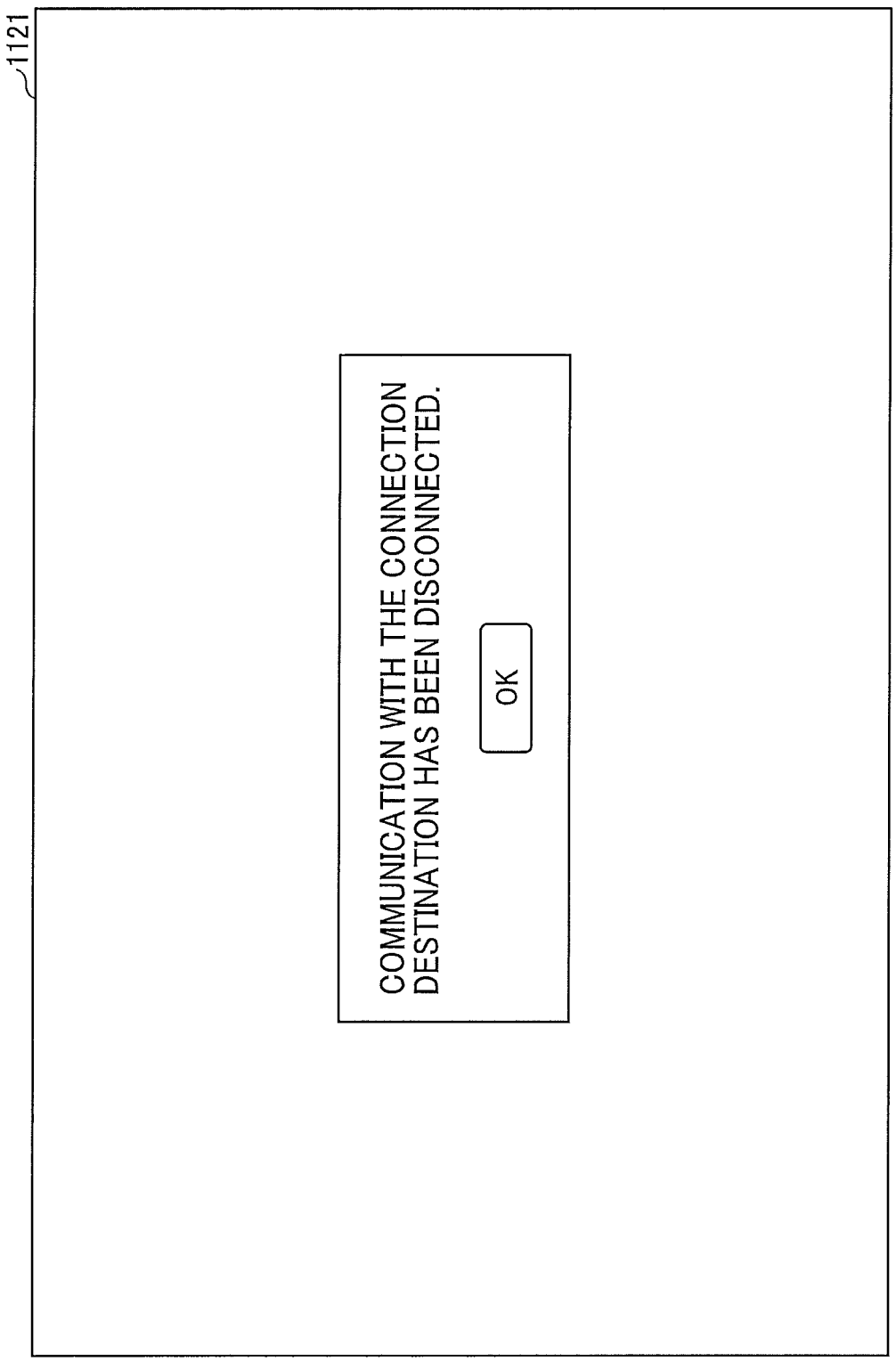
FIG. 21 is a view illustrating an example of a notification screen for notifying a user that the use of the service has been stopped according to an embodiment.

FIG. 21 illustrates an example of a notification screen 1121 displayed on the screen of the information terminal 111 to notify the user that the use of the service has been stopped. The notification screen 1121 displayed on the screen of the information terminal 111 notifies the user that the use of the service has been stopped.

In step S1115, the first communication unit 801 of the secure box 14 transmits to the communication control unit 704 of the management server 10 a success notification indicating that the stop of the use of the service is successful. The success notification includes a notification type indicating "successful service use stop" and the session ID. If the stop of the use of the service has failed for some reason, the notification type may be set to "service use stop failure", and a notification indicating that the stop of the use of the service has failed may be transmitted.

In step S1116, the communication control unit 704 transmits the received success notification to the acceptance unit 702. The success notification includes a notification type indicating "successful service use stop" and the session ID. Further, the acceptance unit 702 may record the received success notification as a log in the following procedure. The acceptance unit 702 transmits the received success notification to the log management unit 706. The log management unit 706 transmits the received success notification to the storage unit 707. The storage unit 707 stores the received success notification. The stop of the use of a service refers to a disconnection of communication between a connection-destination device and an information terminal, and a service use stop request may be referred to as a communication disconnection request.

Through the process described above, the communication system 1 manages a user's use state of a service to enable the administrator to make a request to stop the user from using the service while the user is using the service. For example, upon an emergency such as the occurrence of an incident, a third party can be forced to terminate a use. The communication system 1 is capable of forcibly stopping the service for which the stop of the use is requested. A service use stop request may be executed not only by the administrator operating the management terminal 5 but also by any user operating the information terminal 111 in a similar procedure to request to stop the user from using the service. A plurality of connection destinations may be designated to efficiently execute a service use stop request for the plurality of connection destinations simultaneously and collectively.

Control Process Under Use Prohibition Rule

Next, a process for controlling the use of a service in accordance with the use prohibition rule 336 illustrated in FIG. 22, which defines a period of prohibition of the use of a service for each connection destination, will be described. The use prohibition rule 336 has the following features:

Control is performed such that no new use of a target connection destination is allowed during a period of time defined in the rule. Alternatively, control may be performed such that no new use is allowed from several minutes before the time.

In a situation involving periodic maintenance, a use prohibition period may be repeatedly set.

The prohibition is repeated, for example, every day, every Sunday, or on the first day of every month, and a specific day of the week or a start date and time and an end date and time may be designated.

A mechanism is provided for notifying a user who uses a service immediately before the start time of the prohibition of the use of the service that the use of the service is to be prohibited.

The notification time may be set to, for example, "5 minutes before the start time". In addition, a notification message may be designated as appropriate.

The items of the use prohibition rule 336 will be described hereinafter.

The "prohibition rule ID" is an ID for uniquely identifying a prohibition rule.

The "connection destination ID" is an ID for uniquely identifying a connection destination.

The "start time" is a time indicating the start of the prohibition of the use of the connection destination.

The "end time" is a time indicating the end of the prohibition of the use of the connection destination.

The "repetition" indicates whether the prohibition of the use of the connection destination is repeated for a certain period of time.

The "unit of repetition" is a unit in which the prohibition of the use of the connection destination is repeated.

The "period start date" is the start date of a period of time within which the prohibition of the use of the connection destination is repeated.

The "period end date" is the end date of the period of time within which the prohibition of the use of the connection destination is repeated.

The "notification setting" indicates whether to provide a notification to a user who is using the connection destination.

The "notification time" indicates how many minutes before the use prohibition period a notification is to be provided.

The "notification message" is the description of a message to be notified.

Next, a process for controlling the use of a service by using the use prohibition rule 336 will be described. FIG. 23 is a sequence diagram illustrating an example control process under a use prohibition rule according to an embodiment.

In step S1201, the administrator operates the operation acceptance unit 723 of the management terminal 5 to access the application service system 11 and execute a use prohibition rule registration request.

FIG. 24 illustrates an example of a rule creation screen 1211 for creating a use prohibition rule. The administrator is able to enter the items of the use prohibition rule 336 on the rule creation screen 1211. After entering all of the items, the administrator presses an "OK" button 1220 to execute a use prohibition rule registration request.

In step S1202, the fourth communication unit 721 of the management terminal 5 transmits a use prohibition rule registration request to the second communication unit 701 of the management server 10. The use prohibition rule registration request to be transmitted includes a connection destination ID corresponding to a connection destination designated by the administrator, and the use prohibition rule 336 created by the administrator.

In step S1203, the second communication unit 701 of the management server 10 transmits the received use prohibition rule 336 to the acceptance unit 702. The acceptance unit 702 stores the received use prohibition rule 336 in the database 330. The use prohibition rule 336 may be stored as an additional database of the remote desktop service connection destination list 331 or as a separate database. Further, the second communication unit 701 of the management server 10 transmits to the fourth communication unit 721 of the management terminal 5 a registration completion notification indicating the completion of the prohibition rule registration.

In step S1204, the fourth communication unit 721 of the management terminal 5 transmits the received registration completion notification to the display control unit 722. The display control unit 722 displays the registration completion notification on the screen of the management terminal 5. A process to which the registered use prohibition rule 336 is applied will be described hereinafter.

In step S1205, the processing of steps S1601 to S1620 illustrated in the sequence diagram in FIG. 13 is executed to start a session of the remote desktop service, and; as a result, the user uses the service.

In step S1206, the acceptance unit 702 checks, for each minimum unit of time that can be set in the use prohibition rule 336, all registered rules against the current date and time. The minimum unit is not limited to "minute" and may be, for example, "second", "hour", or "five minutes".

If the result of the check in step S1206 indicates that the current date and time is five minutes before the use prohibition period and that any user is using the target connection destination, then, in step S1207, all the target users are notified of a message. To this end, the acceptance unit 702 acquires, from the remote desktop service connection destination list 331, the session IDs of all the sessions connected to the target connection destination.

In step S1208, the acceptance unit 702 transmits a message notification request to the communication control unit 704. The message notification request to be transmitted includes a secure box ID corresponding to the connection destination ID, a job type indicating "message communication", the acquired session ID, and a message to be transmitted: The subsequent process for notifying a message may be similar to the processing of steps S1011 to S. 1016 in the sequence illustrated in FIG. 15, and the description thereof will thus be omitted. At this time, to prohibit another user from newly using the target connection destination, the acceptance unit 702 may fail to accept a connection request from the other user to connect to the target connection destination.

If the result of the check in step S1206 indicates that the current date and time is included in the use prohibition period and that any user is using the target connection destination; then, in step S1209, all of the target users are stopped from using the service. To this end, the acceptance unit 702 acquires the session IDs of all the sessions connected to the target connection destination, for example, from the remote desktop service connection destination list 331.

In step S1210, the acceptance unit 702 transmits a service use stop request to the communication control unit 704. The service use stop request to be transmitted includes a secure box ID corresponding to the connection destination ID, a job type indicating "service use stop", and the acquired session ID. The subsequent process for stopping the use of the service may be similar to the processing of steps S1111 to S1116 in the sequence illustrated in FIG. 19, and the description thereof will thus be omitted.

Through the process described above, the communication system 1 is capable of notifying each user who is using a service of a message before the user is stopped from using the service or capable of forcibly stopping a service for each user who is using the service in accordance with the use prohibition rule.

The above-described embodiments are illustrative and do not limit the present invention. Thus, numerous additional modifications and variations are possible in light of the above teachings: For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

A group of apparatuses described in one or more embodiments is merely one of a plurality of computing environments for implementing the embodiment disclosed herein. In some embodiments, the management server 10 includes a plurality of computing devices, such as a server cluster. The plurality of computing devices communicate with one another through any type of communication link including, for example, a network or a shared memory, and perform the operations disclosed herein. Likewise, the relay server 13 or the secure box 14 may include a plurality of computing devices configured to communicate with each other. The components of the management server 10 may be integrated into one server apparatus or divided into a plurality of apparatuses.

The second communication unit 701, the third communication unit 711, the fourth communication unit 721, and the first communication unit 801 may be referred to simply as "communication units".

The invention claimed is:

1. A communication system comprising:
an information terminal;
a relay server; and
a connection-destination device,
wherein the relay server includes first circuitry configured to:
establish a first connection between the relay server and the information terminal via a first network,
establish an encrypted second connection between the relay server and the connection-destination device via a second network different from the first network; and
transmit a message from the connection destination device to the information terminal by establishing a relay connection between the second connection and the first connection, the message being to be displayed by the information terminal, based on information related to a use state of the connection-destination device,
wherein the first connection is encrypted by using a session identification, the session identification being used to encrypt the second connection, and
wherein the first circuitry is configured to transmit the encrypted message from the connection destination device to the information terminal without decrypting the encrypted message.

2. The communication system according to claim 1, wherein the information related to the use state of the connection-destination device includes information indicating whether the connection-destination device is in use, information related to a user who is using the connection-destination device, and information related to a date and time when the connection-destination device was last used.

3. The communication system according to claim 1, further comprising:
a terminal apparatus different from the information terminal; and
a management server connected to the terminal apparatus, wherein the management server is connected to the relay server and the connection-destination device,
wherein the management server includes second circuitry configured to transmit, in response to a request from the terminal apparatus, the information related to the use state of the connection-destination device to the terminal apparatus,
wherein the first circuitry is configured to transmit the message to the information terminal in response to receiving, by the management server, a message notification request designating the connection-destination device from the terminal apparatus.

4. The communication system according to claim 3, wherein the first circuitry is configured to transmit the message to the information terminal, the message being transmitted from the terminal apparatus.

5. The communication system according to claim 3, wherein, in a case that the message notification request designates a plurality of connection-destination devices,
the first circuitry is configured to transmit the message to each of a plurality of information terminals that are respectively connected to the plurality of connection-destination devices.

6. The communication system according to claim 3, wherein the first circuitry is configured to transmit a success notification to the information terminal, the success notification being a notification indicating that transmission of the message is successful.

7. The communication system according to claim 3, wherein the first circuitry is configured to transmit, in response to receiving, by the management server, a communication disconnection request designating the connection-destination device from the terminal apparatus to disconnect the relay connection between the second connection and the first connection, a notification indicating that a service is to be stopped to the information terminal.

8. The communication system according to claim 7, wherein, in a case that the communication disconnection request designates a plurality of connection-destination devices,
the first circuitry is configured to transmit a notification indicating that the relay connection between the second connection and the first connection is to be disconnected to each of a plurality of information terminals respectively connected to the plurality of connection-destination devices.

9. The communication system according to claim 1,
wherein the information related to the use state of the connection-destination device includes a use prohibition rule that defines a period of prohibition of communication for the connection-destination device, and
wherein the first circuitry is configured to transmit a message indicating that the relay connection is to be prohibited to the information terminal in accordance with the use prohibition rule.

10. The communication system according to claim 9,
wherein the use prohibition rule specifies a start date and time of a period of prohibition of use of the connection-destination device, an end date and time of the period, and a repetition of the period, and
wherein the first circuitry is configured to transmit the message indicating that communication is to be prohibited to the information terminal at a time before the start date and time in accordance with the use prohibition rule.

11. The communication system according to claim 1,
wherein the message is related to maintenance of the connection destination device.

12. An information processing apparatus comprising:
circuitry configured to:
    establish a first connection between the information processing apparatus and an information terminal via a first network,
    establish an encrypted second connection between the information processing apparatus and a connection-destination device via a second network different from the first network; and
    transmit a message from the connection destination device to the information terminal by establishing a relay connection between the second connection and the first connection, the message being to be displayed by the information terminal, based on information related to a use state of the connection-destination device,
wherein the first connection is encrypted by using a session identification, the session identification being used to encrypt the second connection, and
wherein the circuitry is configured to transmit the encrypted message from the connection destination device to the information terminal without decrypting the encrypted message.

13. An information processing method executed by an information processing apparatus, the method comprising:
    establishing a first connection between the information processing apparatus and an information terminal via a first network,
    establishing an encrypted second connection between the information processing apparatus and a connection-destination device via a second network different from the first network; and
    transmitting a message from the connection destination device to the information terminal by establishing a relay connection between the second connection and the first connection, the message being to be displayed by the information terminal, based on information related to a use state of the connection-destination device,
wherein the first connection is encrypted by using a session identification, the session identification being used to encrypt the second connection, and
wherein the transmitting transmits the encrypted message from the connection destination device to the information terminal without decrypting the encrypted message.

* * * * *